United States Patent
Lokovic et al.

(10) Patent No.: US 7,233,332 B2
(45) Date of Patent: Jun. 19, 2007

(54) METHOD AND APPARATUS FOR RENDERING SHADOWS

(75) Inventors: Thomas David Lokovic, Richmond, CA (US); Eric Hugh Veach, Bellevue, WA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 11/274,883

(22) Filed: Nov. 14, 2005

(65) Prior Publication Data
US 2006/0119600 A1  Jun. 8, 2006

Related U.S. Application Data

(63) Continuation of application No. 10/686,551, filed on Oct. 14, 2003, now Pat. No. 7,023,438, which is a continuation of application No. 09/619,064, filed on Jul. 19, 2000, now Pat. No. 6,760,024.

(51) Int. Cl.
*G06T 15/50* (2006.01)

(52) U.S. Cl. ............ 345/426; 345/421; 345/422; 345/424; 345/427; 345/581; 345/582; 345/586; 345/589; 345/629

(58) Field of Classification Search ............... 345/426, 345/421, 422, 427, 424, 581, 582, 586, 589, 345/629
See application file for complete search history.

(56) References Cited

U.S. PATENT DOCUMENTS 5,742,749 A  4/1998  Foran et al.
5,870,097 A  2/1999  Snyder et al.
6,111,582 A  8/2000  Jenkins
6,897,865 B2  5/2005  Higashiyama
6,961,058 B2  11/2005  Guo et al.

OTHER PUBLICATIONS

Agrawala et al., Efficient image-based methods for rendering soft shadows, Computer Graphics, (*SIGGRAPH 2000 Proceedings*) pp. 375-384.
Chang et al., LDI tree: a hierarchical representation for Image-based rendering, Computer Graphics (*SIGGRAPH 99 Proceedings*) pp. 291-298.
Heckbert, Survey of texture mapping. *IEEE Computer Graphics and Applications*, 6(11):56-67, Nov. 1986.

(Continued)

*Primary Examiner*—Kimbinh T. Nguyen
(74) *Attorney, Agent, or Firm*—Townsend and Townsend and Crew LLP

(57) ABSTRACT

A method and apparatus for rendering shadows. A pre-rendering process implements a two dimensional array or map of depth-based functions, such as a visibility function in z. During rendering of an object scene, these functions are accessed via lookup operations to efficiently determine the function value for a sample point at a given depth. The use of visibility functions allows for partial light attenuation effects. Each visibility function is computed by filtering multiple transmittance functions obtained by casting sample rays from a light source onto an object scene. The visibility function is implemented as a sequence of vertices. Colored shadows are modeled by vertices comprising a depth value and separate visibility function values for red, green, and blue light at a given depth value. Compression is achieved by minimizing the number of vertices needed to represent a visibility function within a desired error tolerance.

13 Claims, 25 Drawing Sheets

OTHER PUBLICATIONS

Kajiya et al., Ray tracing volume densities. In *Computer Graphics (SIGGRAPH '84 Proceedings)*, vol. 18, pp. 165-174, Jul. 1984.

Kajiya et al., Rendering fur with three-dimensional textures. In *Computer Graphics (SIGGRAPH '89 Proceedings)*, vol. 23, pp. 271-280, Jul. 1989.

Keating et al., Shadow penumbras for complex objects by depth-dependent filtering of multi-layer depth images. In *Eurographics Rendering Workshop 1999*, pp. 205-220, New York, Jun. 1999. Springer-Verlag.

Levoy et al., Light Field Rendering, Computer Graphics (*SIGGRAPH '96 Proceedings*) pp. 31-42.

Levoy, *Display of Surfaces from Volume Data*.Ph.D thesis, University of North Carolina at Chapel Hill, 1989.

Lokovic et al., Deep Shadows Maps. In Proceedings of SIGGRAPH 2000, Computer Graphics Proceedings, Annual Conference Series, pp. 385-392, 2000. K. Akeley, editor, http://graphics.stanford.edu/papers/deepshadows, printed Sep. 1, 2004.

Max, Hierarchical rendering of trees from precomputed multi-layer Z-buffers. In *Eurographics Rendering Workshop 1996*, pp. 165-174, New York, Jun. 1996.

Mitchell, Consequences of stratified sampling in graphics. In *SIGGRAPH 96 Proceedings*, pp. 277-280. Addison Wesley, Aug. 1996.

Reeves et al., Rendering antialiased shadows with depth maps. In *Computer Graphics (SIGGRAPH '87 Proceedings)*, vol. 21, pp. 283-291, Jul. 1987.

Shade et al., Layered depth images. In *SIGGRAPH 98 Proceedings*, pp. 231-242. Addison Wesley, Jul. 1998.

Soler et al, Fast calculation of soft shadow textures using convolution, Computer Graphics (*SIGGRAPH 98 Proceedings*) pp. 321-322.

Williams, Casting curved shadows on curved surfaces. *Computer Graphics (SIGGRAPH '78 Proceedings)*, 12(3):270-274, Aug. 1978.

Williams, Pyramidal parametrics. *Computer Graphics (SIGGRAPH '83 Proceedings)*, 17(3):1-11, Jul. 1983.

Woo et al., A survey of shadow algorithms. *IEEE Computer Graphics and Applications*, 10(6):13-32, Nov. 1990.

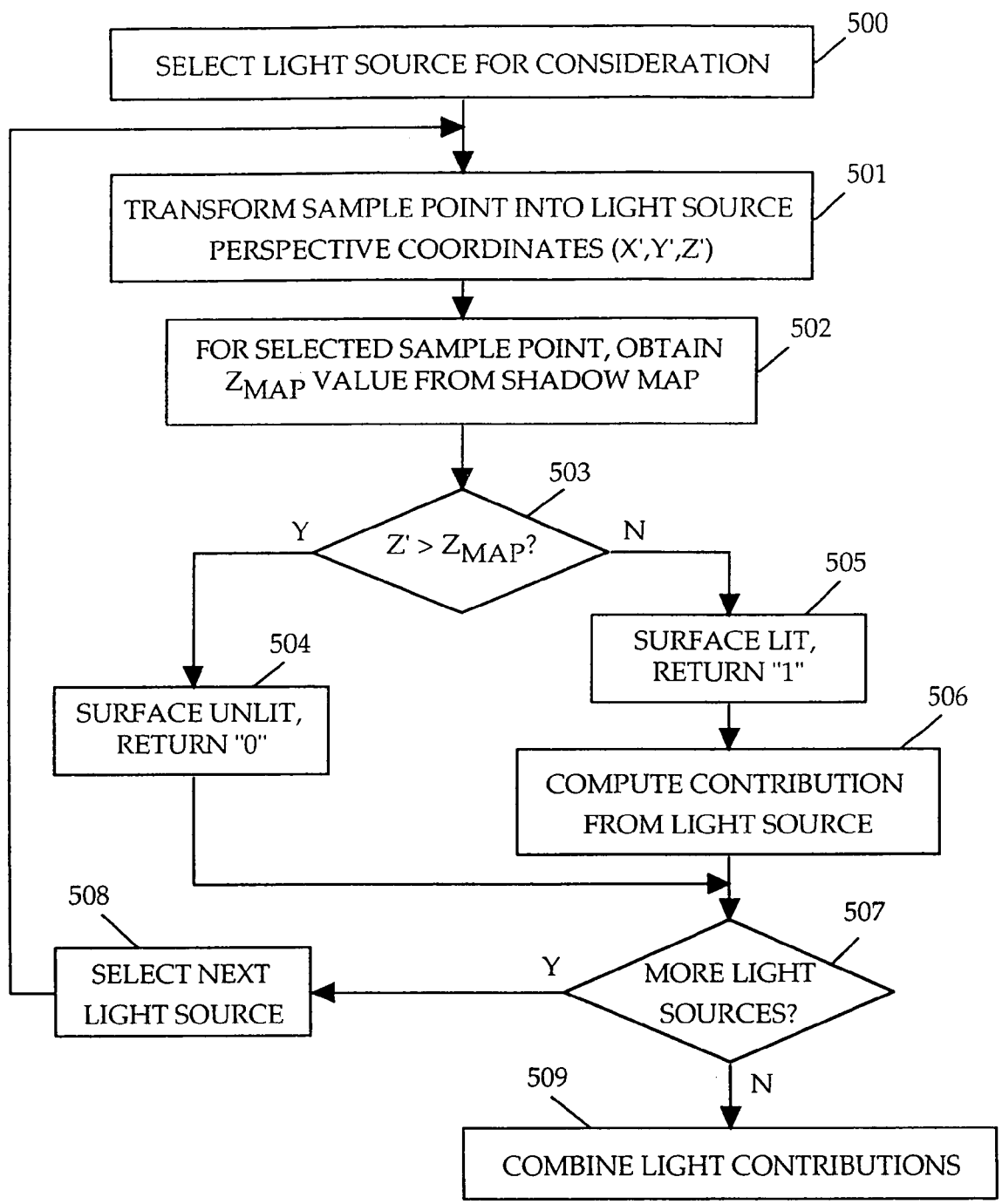

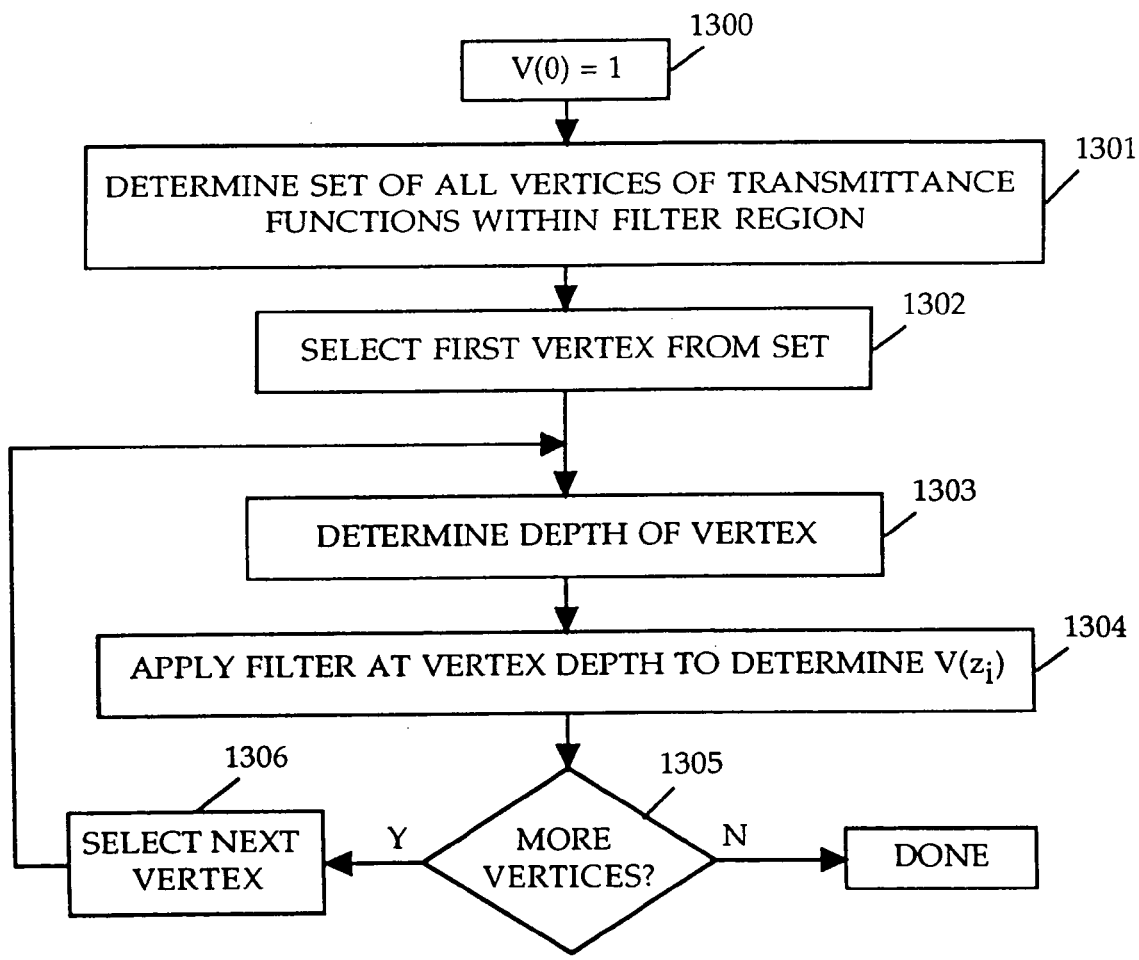

METHOD AND APPARATUS FOR RENDERING SHADOWS

CROSS-REFERENCES TO RELATED APPLICATIONS

This application is a continuation of U.S. application Ser. No. 10/686,551, filed Oct. 14, 2003, now U.S. Pat. No. 7,023,438 which is a continuation of U.S. application Ser. No. 09/619,064, filed Jul. 19, 2000, now U.S. Pat. No. 6,760,024 which are incorporated by reference herein.

BACKGROUND OF THE INVENTION

1. Field of the Invention

This invention relates to the field of computer graphics, and, more specifically, to graphical rendering of shadows.

2. Background Art

In computer graphics, images are often created from three-dimensional objects modeled within a computer. The process of transforming the three-dimensional object data within the computer into viewable images is referred to as rendering. Single still images may be rendered, or sequences of images may be rendered for an animated presentation. One aspect of rendering involves the determination of lighting effects on the surface of an object, and in particular, the accurate representation of shadows within the rendered image. Unfortunately, typical shadow rendering techniques do not satisfactorily support rendering of finely detailed elements, such as fur or hair. Also, because surfaces are generally classified as either "lit" or "unlit," shadows from semitransparent surfaces and volumes, such as fog, cannot be accurately represented. To illustrate these problems with known shadowing techniques, a general description of image rendering is provided below with reference to a common method for rendering shadows known as "shadowmaps."

Image Rendering

Typically, rendering is performed by establishing a viewpoint or viewing camera location within an artificial "world space" containing the three-dimensional objects to be rendered. A "view plane," comprising a two-dimensional array of pixel regions, is defined between the viewing camera location and the objects to be rendered (also referred to herein as the "object scene"). To render a given pixel for an image, a ray is cast from the viewing camera, through the pixel region of the view plane associated with that pixel, to intersect a surface of the object scene. Image data associated with the surface at that point or region is computed based on shading properties of the surface, such as color, texture and lighting characteristics. Multiple points, sampled from within a region of the object scene defined by the projection of the pixel region along the ray, may be used to compute the image data for that pixel (e.g., by applying a filtering function to the samples obtained over the pixel region). As a result of rendering, image data (e.g., RGB color data) is associated with each pixel. The pixel array of image data may be output to a display device, or stored for later viewing or further processing.

In photorealistic rendering, as part of the determination of lighting characteristics of a point or points on a surface, shadowing effects are considered. That is, a determination is made of whether each light source in the object scene contributes to the computed color value of the pixel. This entails identifying whether the light emitted from each light source is transmitted unoccluded to the given point on the surface or whether the light is blocked by some other element of the object scene, i.e., whether the given point is shadowed by another object. Note that a light source may be any type of modeled light source or other source of illumination, such as the reflective surface of an object.

An example of a rendering scenario is illustrated in the diagram of FIG. 1. A camera location 100 (or viewpoint) is identified adjacent to an object scene comprising objects 104 and 105. A light source 101 is positioned above the object scene such that object 104 casts shadow 106 upon the surface of object 105. Camera location 100 and light source 101 have different perspectives of the object scene based on their respective locations and view/projection direction. These differing perspectives are shown in FIG. 1 as separate coordinate systems (x, y, z) and (x', y', z'), respectively. For the rendering operation, a view plane 102 is positioned between the camera location and the object scene. View plane 102 is two-dimensional in x and y with finite dimensions, and comprises an array of pixel regions (e.g., pixel regions 103A and 103B). Each pixel region corresponds to a pixel of the output image.

To sample the object scene for pixel region 103A, ray 107A is projected from camera location 100, through pixel region 103A, onto surface 105 at sample point 108A. Similarly, for pixel region 103B, ray 107B is traced from camera location 100, through pixel region 103B, onto surface 105 at sample point 108B. The surface properties at the sample point are evaluated to determine the image data to associate with the corresponding pixel. As part of this evaluation, the rendering process determines whether the sample point is lit or shadowed with respect to each light source in the scene.

In the example of FIG. 1, sample point 108A lies within shadow 106 cast by object 104, and is therefore unlit by light source 101. Thus, the surface properties evaluated for sample point 108A do not consider a lighting contribution from light source 101. In contrast, sample point 108B is not shadowed. The surface properties evaluated for sample point 108B must therefore account for a lighting contribution from light source 101. As previously indicated, multiple samples may be taken from within each projected pixel region and combined within a filter function to obtain image data for the corresponding pixel. In this case, some samples may lie within a shadow while other samples within the same pixel region are lit by the light source.

Shadow Maps

To improve rendering efficiency, the process of determining shadows within an object scene may be performed as part of a separate pre-rendering process that generates depth maps known as "shadow maps." A later rendering process is then able to use simple lookup functions of the shadow map to determine whether a particular sample point is lit or unlit with respect to a light source.

As shown in FIG. 2, a shadow map is a two-dimensional array of depth or z-values (e.g., $Z_0$, $Z_1$, $Z_2$, etc.) computed from the perspective of a given light source. The shadow map is similar to an image rendered with the light source acting as the camera location, where depth values are stored at each array location rather than pixel color data. For each (x,y) index pair of the shadow map, a single z value is stored that specifies the depth at which the light emitted by that given light source is blocked by a surface in the object scene. Elements having depth values greater than the given z value are therefore shadowed, whereas elements that have depth values less than the given z value are lit.

FIG. 3 illustrates how a shadow map is created for a given light source (represented herein as a point source for sake of illustration). Where multiple light sources are present, this technique is repeated for each light source. A finite map plane 300 is positioned between a light source 301 and the object scene comprising surface 302. Map plane 300 represents the two-dimensional (x,y) array of sample points or regions. A ray 305 is cast from light source 301 through sample region 303 to find a point 304 on surface 302 that projects onto the sample region. Sample point 304 is selected as the point on the first encountered surface (i.e. surface 302) that projects onto the sample region. For sample point 304, the z value ($Z_{MAP}$) is determined in the light source's coordinate system and stored in the shadow map at the (x,y) location corresponding to the sample region 303 of map plane 300. Objects that intersect the sample region are considered fully lit (value of "1") for z values less than $Z_{MAP}$ (i.e., objects in front of surface 302), and considered completely unlit (value of "0") for z values greater than $Z_{MAP}$ (i.e., objects behind of surface 302).

A process for creating a shadow map known as ray casting is shown in FIG. 4. As shown, a sample location in the shadow map is selected for pre-rendering in step 400. In step 401, the pre-rendering process traces a ray from the light source location through the corresponding sample region of the map plane to determine and select a point on the object scene (i.e. first encountered surface) that projects onto the sample region. In step 402, for the sample point selected from within the sample region, the associated z value of the first surface encountered by the projection is stored in the sample location of the shadow map. (If no surface is intersected, a maximum z value may be used.) In step 403, if no more sample locations require pre-rendering for shadow data, the shadow map is complete for the current light source (step 405). If, in step 403, one or more sample locations within the shadow map remain unrendered, the next sample location is selected in step 404, and the process returns to step 401.

Although ray casting method of shadow map generation is discussed in this overview for simplicity, it should be noted that, in practice, methods like rasterization techniques (e.g. z-buffer) are often used.

The above ray casting process may be repeated for each light source within the object scene. Once pre-rendering is complete and each light source has a completed shadow map, standard rendering may be performed from the perspective of the camera location as previously described with respect to FIG. 1. FIG. 5 illustrates one possible method by which a rendering process may utilize pre-rendered shadow maps.

The method of FIG. 5 is applied after a sample point has been identified within a projected pixel region, during the lighting phase of rendering. In step 500, a first light source is selected for consideration. In step 501, the (x, y, z) coordinate location of the sample point from the camera's perspective is transformed into an (x', y', z') location from the perspective of the given light source. For the given (x', y') coordinates of the sample point, a value $Z_{MAP}$ is obtained from the light source's associated shadow map in step 502.

In step 503, the z' coordinate of the sample point is compared with $Z_{MAP}$. If z' is greater than $Z_{MAP}$, in step 504, a lighting value of "0" is passed to the general rendering process, indicating that the sample point is unlit with respect to the current light source. Step 504 then proceeds to step 507. However, if z' is less than or equal to $Z_{MAP}$ in step 503, a lighting value of "1" is passed to the general rendering process in step 505, indicating that the sample point is lit with respect to the current light source. In step 506, the current light source contribution is computed for determining the shading of the current sample point. The light source contribution may be computed, for example, based upon factors such as the color and intensity of the light source, the distance of the light source from the sample point, the angle of incidence of the light ray with the surface, and the lighting characteristics of the surface (e.g., color, opacity, reflectivity, roughness, surface angle with respect to camera, etc.). From step 506, the method proceeds to step 507.

In step 507, if there are other light sources to consider, the next light source is selected in step 508, and the method returns to step 501. If, in step 507, there are no further light sources to consider, all computed light source contributions are combined in step 509 to determine the color output for the current sample (in addition to other rendering processes such as texture mapping).

As previously stated, a pixel region may comprise multiple samples computed in the manner described above. A filtering function is used to combine the samples into a single color value (e.g., RGB) for a pixel, typically assigning weighting coefficients biased towards the center of the pixel region.

Traditional shadow maps need very high resolutions to accurately capture photorealistic self-shadowing (i.e. shadows cast by portions of an object onto itself) images. Higher quality antialiased shadows are possible with a process known as percentage closer filtering, which examines depth samples within a given filter region and computes the fraction that are closer than the given depth z. Percentage closer filtering is described in a paper by William T. Reeves, et. al, entitled "Rendering Antialiased Shadows with Depth maps," Computer Graphics (SIGGRAPH '87 Proceedings), volume 21, pages 283–291, July 1987, and is incorporated herein by reference.

Percentage closer filtering relies heavily on a process known as stratified sampling, both in generating the original shadow map and in selecting a random subset of depth samples for filtering. Stratified sampling is described in a paper by Don P. Mitchell, entitled "Consequences of Stratified Sampling in Graphics," SIGGRAPH 96 Proceedings, pages 277–280, Adison Wesley, August 1996, and is incorporated herein by reference.

While shadow maps may be satisfactory for rendering shadows of large, opaque objects, shadow maps do not work well for finely detailed geometry, such as hair, or semitransparent surfaces or volumes, such as fog or smoke. This is because stratified sampling works much better near a single discontinuity (such as an isolated silhouette) than where there are many discontinuities crossing the filter region. This means that when rendering fur or other fine geometry, a much larger number of samples is needed in order to reduce noise artifacts such as sparkling to an acceptable level.

FIG. 6A illustrates an isolated silhouette edge crossing a pixel region for a shadow lookup, which is evaluated with N samples jittered over a $\sqrt{N} \times \sqrt{N}$ grid of sample cells. Using percentage closer filtering, each sample contributes either 0 or 1 depending on the relative z values of the shadow map and the test point. The samples in the upper left are clearly lit (contributing "1"), whereas those samples in the lower right are clearly shadowed (contributing "0"). In this situation, the samples that contribute to the variance are those whose cells are crossed by the silhouette edge (indicated with cross-hatching). There are $O(N^{1/2})$ such cells, and further analysis shows that the expected error in this case is $O(N^{-3/4})$. This means that near large silhouette edges, stratification yields much better results than unstratified Monte Carlo sampling, which has an expected error of $O(N^{-1/2})$.

In the case of hair or fur, however, the pixel region is crossed by many silhouette edges, as shown in FIG. 6B. In this case, every one of the N sample cells is crossed by an edge, and the corresponding expected error is $O(N^{-1/2})$. This means that, in the case of very fine geometry, stratified sampling does no better than unstratified sampling.

These error bounds have a dramatic effect on the number of samples required to reduce noise below a given threshold. For example, to achieve an expected error of 1%, approximately N=140 samples are needed near an isolated silhouette, while N=2500 samples are required near a point that is 50% obscured by dense fur. Furthermore, if the same amount of shadow detail is desired in both cases (i.e., a similar filter size in world space), then the underlying shadow map resolution must be increased by the same factor. To gain any benefit from stratification, the shadow map would need to be fine enough to resolve the silhouettes of individual hairs, and the filter region small enough that only a few edges cross it. Since such conditions are rarely satisfied in practice, shadow maps for high-quality hair rendering are typically large and slow.

A typical way of reducing the memory required by such large shadow maps is by compression. However, standard shadow maps do not behave well under compression. As described above, higher map resolutions are needed to reduce errors to an acceptable level. Compression in x and y would entail fewer samples and thus greater error. Compression in z, such as by reducing the number of bits representing z values in the shadow map, introduces a roundoff error in specifying the location of a first blocking surface. Where the roundoff error causes $Z_{MAP}$ to be less than the actual value, the top surface will appear to be behind $Z_{MAP}$, resulting in erroneous "self-shadowing" of the top surface. Where the roundoff error causes $Z_{MAP}$ to be greater than the actual value, surfaces that would normally be shadowed may now be considered completely lit. In either of these scenarios, visible rendering errors will result. However, lossless compression is acceptable, but the compression ratios are relatively small and provide no significant space benefit. Thus, compression is not a viable solution for standard shadow maps.

Other Shadow Techniques

One method for determining shadows is to perform ray casting. That is, a ray is cast to the sample point on the surface. Ray casting can generate accurate shadows, but on scenes with very complex geometry, ray casting is too expensive in terms of time and memory. It is also difficult, other than by using an expensive area light source, to soften shadows for artistic purposes, which in the case of standard shadow maps is achieved by simply increasing the filter width.

Another possible approach to shadowing is to precompute the shadow density as a 3D texture. This technique has been used with some success for clouds. The main drawback is that 3D textures have a relatively coarse resolution, as well as a limited range and low accuracy in z (which creates bias problems). A 3D texture with sufficient detail to capture accurate surface shadows would be prohibitively large.

Multi-layer Z-buffers and layered depth images are yet other methods that may be used for shadow maps. Multi-layer Z-buffers and layered depth images store information at multiple depths per pixel, but are geared toward rendering opaque surfaces from new viewpoints rather than shadow evaluation. Multi-layer depth images have been applied to the problem of shadow penumbras, but this technique otherwise has the same limitations as ordinary shadow maps.

SUMMARY OF THE INVENTION

A method and apparatus for rendering shadows are described. Embodiments of the invention implement a two-dimensional array or map of depth-based functions, such as a visibility function in z. During rendering of an object scene, these functions are accessed via lookup operations to efficiently determine the function value for a sample point at a given depth. The use of visibility functions allows for partial light attenuation effects such as partially blocking surfaces, semi-transparent surfaces and volumetric elements, to be accurately modeled over a range of z values. Thus, in contrast to prior art shadow map methods in which a point on a surface is either fully lit or completely shadowed with respect to a light source, it is possible for a point on a surface to be more realistically rendered as being fractionally lit by a light source.

In one or more embodiments, each visibility function is determined from multiple transmittance functions. A transmittance function describes the light falloff along a particular ray cast from the light source onto the object scene. The visibility function for a given pixel is obtained by combining the transmittance functions along one or more rays cast through that pixel's filter region. Along each sample ray, a surface transmittance function is computed for all surfaces intersected by the ray and a volume transmittance is generated for volumetric elements traversed by the ray. A total transmittance function for the ray is determined from the product of the surface and volume transmittance functions. The visibility function is computed as a weighted sum of the transmittance functions obtained from the filter region, and is stored in a map location associated with the filter region. An incremental updating method is utilized for more efficient computation of the weighted sum.

In one or more embodiments, the visibility function is piecewise linear, implemented as a sequence of vertices, each comprising a depth (z) value and corresponding function value. Compression is achieved by minimizing the number of vertices needed to represent the visibility function within a desired error tolerance. Multiple visibility functions (such as individual color visibility functions for R, G and B) may be efficiently represented by a sequence of vertices, each comprising one depth value and two or more function values respectively associated with the individual visibility functions at the given depth value. A flag may be associated with each map location to specify whether that location is monochrome (one visibility function) or color (separate RGB visibility functions).

During rendering, a visibility value is obtained from the stored map by performing a lookup in x and y to determine the specific function in the map, performing a linear or binary search of the corresponding sequence of vertices to locate the linear segment containing the desired depth or z value, and interpolating the function value along that linear segment. Efficient lookups are facilitated by storing a pointer to the most recently accessed segment, and initiating a subsequent search from that segment.

In one or more embodiments, multiple maps are stored at different resolutions. Each new map level is obtained, for example, by averaging and downsampling the previous level by a factor of two in x and y. Each map element is defined by taking the average of four visibility functions, and recompressing the result. Mip-mapping techniques may then be applied for more efficient shadow lookups during rendering.

To improve data access during the rendering process, portions of a map may be cached. The cache contains multiple cache lines that are each capable of storing a tile of map data. A map tile may comprise, for example, a two-dimensional subset of map locations. Because different visibility functions may contain varying numbers of vertices, the storage allocation size of map tiles may also vary. For more efficient memory performance, the sizes of cache lines may be dynamically resized as map tiles are swapped, to reflect the individual storage requirements of the current map tiles resident in the cache.

BRIEF DESCRIPTION OF THE DRAWINGS

FIG. 5 is a flow diagram of a method for performing shadow map lookups.

FIG. 12 is a diagram of a two-dimensional filter function.

FIGS. 13A–13C are flow diagrams of methods for obtaining a visibility function by applying a filter, in accordance with one or more embodiments of the invention.

DETAILED DESCRIPTION OF THE INVENTION

The invention is a method and apparatus for rendering shadows. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

In this specification, "map location" is used interchangeably with "pixel" to mean an element of any shape or form in the image that is in consideration.

Deep Shadow Map Overview

Embodiments of the invention employ a new form of shadow map, referred to herein as a "deep shadow map," to provide greater flexibility and realism in the rendering of shadows. As opposed to shadow maps of the prior art that treat shadows in a binary manner (i.e., a surface is either lit or unlit) based on a single stored depth value, deep shadow maps permit partial shadowing to be represented explicitly as a function that varies with depth. A deep shadow map stores a fractional visibility function (hereinafter "visibility function") that records the approximate amount of light that passes through the pixel and penetrates to each depth. The visibility function takes into account not only the opacities of the surfaces and volume elements encountered, but also their coverage of the filter region. Partial shadowing facilitates accurate and efficient rendering of shadows caused by "real world" lighting conditions such as partially blocking elements, semitransparent surfaces and volumetric elements.

An important feature of deep shadow maps is generality: deep shadow maps support ordinary surfaces, volumetric effects, dense fur, and even motion blur, effects that would normally be handled using different techniques. With deep shadow maps, these effects can all be combined in a single compact data structure, and rendered efficiently under a wide range of viewing and filtering conditions.

A deep shadow map can be viewed as a two-dimensional array of piecewise linear one-dimensional functions. The representation is sparse in z, which allows it to take advantage of any smoothness in the raw data, while it is discrete in x and y in order to facilitate fast lookups. The domain can be mapped to a frustum or an orthographic space, and has the advantage of having an arbitrary extent and resolution in one of its dimensions. Further, three-dimensional filtering can be implemented, since the adjacent data values in z can be found without searching and the representation is sparse in this direction. Deep shadow maps are a useful representation for arbitrary volumetric data: fog densities, approximate illumination information, etc.

Visibility Functions

Figure 7:
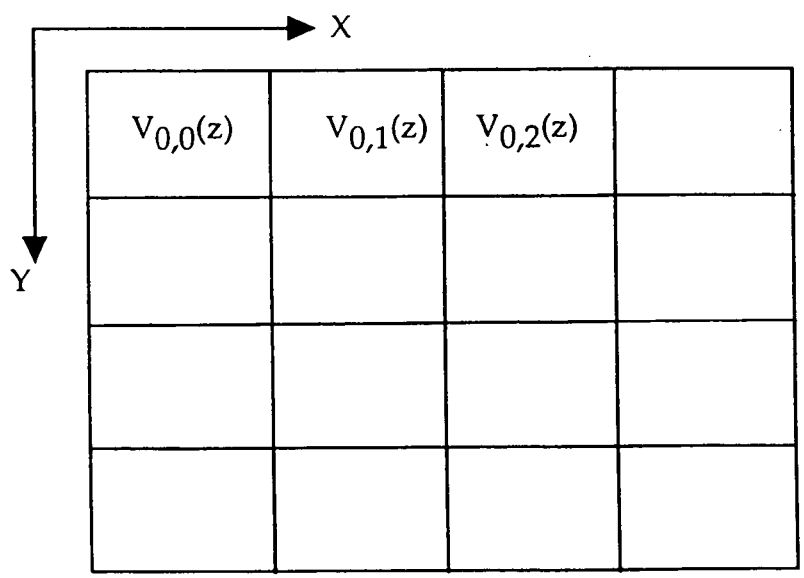
FIG. 7 is a diagram of a deep shadow map in accordance with an embodiment of the invention.

In one embodiment of the invention, a deep shadow map is implemented as a rectangular array of elements, where every element stores a visibility function. This implementation is illustrated in FIG. 7 as a two-dimensional array in x and y, in which each array element comprises a depth-based visibility function V(z) (e.g., $V_{0,0}(z)$, $V_{0,1}(z)$, etc.). The rectangular array of the deep shadow map corresponds to the map plane located between the light source and the object scene, with each map location (i.e., array element) being associated with a two-dimensional filter region of the map plane. To better understand visibility functions, consider a beam of light that starts at the light source origin (z=0), and passes through a given pixel of the filter region. For that pixel, the visibility function value at a given depth is the fraction of the light beam's initial power that penetrates to that depth. Note that the light beam is not necessarily square; the beam can be shaped and weighted according to any desired pixel filter. Further, the filter regions for adjacent pixels may overlap in some embodiments.

Figure 8A:
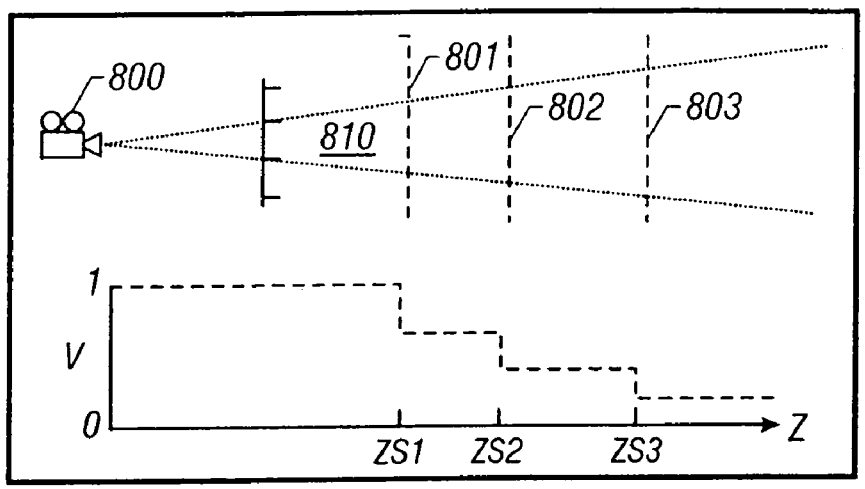
FIG. 8A is a diagram of a visibility function over a region crossed by multiple semitransparent surfaces.
Figure 8B:
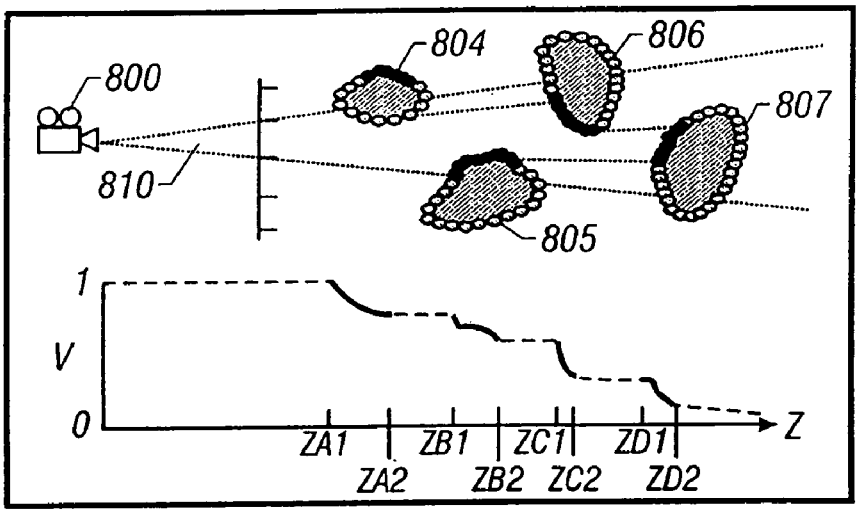
FIG. 8B is a diagram of a visibility function over a region in which partial blocking occurs.
Figure 8C:
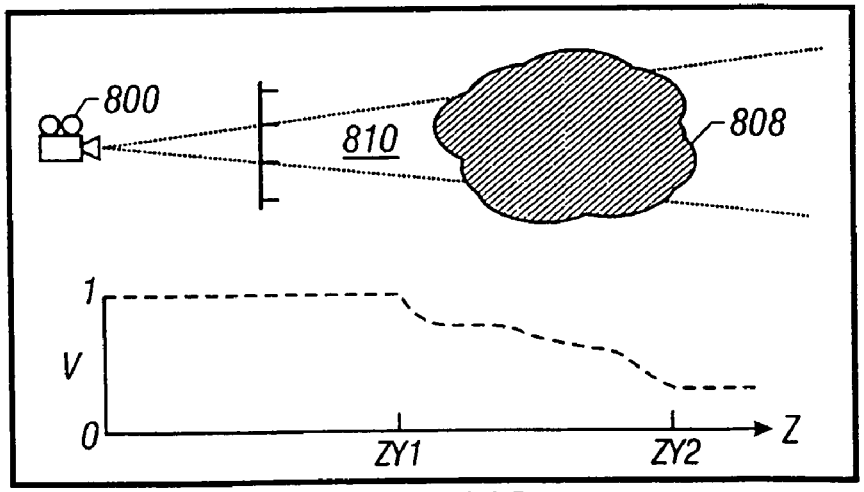
FIG. 8C is a diagram of a visibility function over a region comprising an object with volumetric characteristics.

FIGS. 8A–8C illustrate (from side-view) several examples of visibility functions for a light beam passing through a pixel of the deep shadow map given different forms of light attenuating circumstances. Specifically, FIG. 8A illustrates a sequence of semitransparent surfaces stacked in front of the light beam; FIG. 8B illustrates the effect of multiple opaque objects partially blocking the light beam at different depths; and FIG. 8C illustrates light attenuation through a volumetric element such as fog. In each case, the visibility function is defined from a value of "1," indicating no light attenuation, decreasing to "0," indicating complete blocking of the light beam. It will be obvious that the invention may also be practiced with different numerical values assigned to these conditions.

In FIG. 8A, light source 800 projects light beam 810 through a stack of semitransparent surfaces, 801–803. It is assumed for simplicity in this example that the surfaces are planar and constant in z. The beam's power is reduced as it passes through each consecutive semitransparent surface. As shown, the visibility function steps down at depth $Z_{S1}$ when surface 801 is intersected. The amount of attenuation at $Z_{S1}$ is dependent upon the opacity of surface 801. Unlike prior art shadowing methods, if the opacity of surface 801 is not equal to "1" (i.e., not completely opaque), the visibility value after $Z_{S1}$ is nonzero. At depths $Z_{S2}$ and $Z_{S3}$, the visibility function is subject to further attenuation steps based upon the level of opacity of surfaces 802 and 803, respectively. Thus, the attenuation contributions of each successive semitransparent surface are accounted for in the visibility function. In contrast, because only a single depth value is stored, a shadow map of the prior art would represent the light beam as completely blocked at depth $Z_{S1}$, introducing lighting errors at depths beyond $Z_{S1}$.

In FIG. 8B, light source 800 projects light beam 810 through a region of an object scene impinged upon by opaque objects 804–807. In this situation, the visibility function is reduced as a function of the beam cross-section blocked by the blocking object. As the remaining cross-sectional area of the beam diminishes, the visibility function decreases as well. In the illustrated example, beam 810 is impinged upon by object 804 beginning at depth $Z_{A1}$, up to a maximum cross-sectional blockage at depth $Z_{A2}$. The visibility function then remains constant until depth $Z_{B1}$, at which point the visibility function again drops in value through depth $Z_{B2}$, the depth of maximum blockage from object 805. A similar reduction is experienced between depths $Z_{C1}$ and $Z_{C2}$ based upon encroachment of object 806 on the remaining beam cross-section. From depth $Z_{D1}$ to depth $Z_{D2}$, the visibility function decreases to zero as object 807 blocks the remaining portion of the projected beam. Beyond $Z_{D2}$, there is no light contribution from light source 800 due to the accumulated blockage by opaque objects 804–807.

Note that a shadow map of the prior art would represent the scenario of FIG. 8B with a single depth value z wherein the visibility transitions instantaneously from 1 to 0, disregarding any effects due to the partial blocking. Such a limited representation introduces significant error in the shadow rendering process. To decrease this error, a shadow map of the prior art would need to be of fine enough resolution to resolve each of the blocking objects, increasing memory requirements as well as rendering time.

In FIG. 8C, light source 800 projects light beam 810 through a volumetric element 808 such as fog, which reduces the power of the light beam as a continuous function of depth. The visibility function is constant at 1 until light beam 810 encounters the leading edge of volumetric element 808 at depth $Z_{V1}$. The visibility decreases continuously from depth $Z_{V1}$ until the beam exits the trailing edge of volumetric element 808 at depth $Z_{V2}$, after which the visibility function is again constant. The rate of decrease in beam power within the volumetric element 808 may vary based upon depth-dependent functions of the volumetric element, such as fog density. Such characteristics can be accurately represented with a visibility function as shown. In shadow maps of the prior art, such volumetric elements must be treated as opaque objects, or not represented in the shadow map at all.

Transmittance and Prefiltering

Considering a ray of light that starts at the light source origin and passes through the point (x, y) on the image plane. Some fraction of the light emitted along this ray will be attenuated by surfaces or by volumetric scattering and absorption. The fraction of light that penetrates to a given depth z is known as the transmittance τ(x, y, z). For deep shadow maps, τ is referred to as a "transmittance function" when considering the transmittance at a fixed image point (x, y) as a function of z.

In one or more embodiments of the invention, the visibility function for a given pixel is based on transmittance. The visibility function for each map location is obtained by filtering the nearby transmittance functions, and resampling at the center of the pixel. This can be better understood by considering a particular depth z. The transmittance at every point in this z-plane is given by τ(x,y,z), and the visibility function $V_{i,j}$ for each pixel in the deep shadow map is obtained by filtering these values as follows:

$$V_{i,j}(z) = \int_{-r}^{r}\int_{-r}^{r} f(s,t)\tau\left(i+\frac{1}{2}+s, j+\frac{1}{2}+t, z\right)ds\,dt$$

where (i+½, j+½) is the center of the region associated with the pixel (i,j), f(s,t) is the desired bandlimiting filter (centered around the origin), and r is the filter radius. This definition is similar to ordinary image filtering, except that it applies to every z value separately.

An advantage of deep shadow maps over regular shadow maps is that prefiltering is supported. Prior art techniques for generating shadow maps do not support prefiltering because the shadow maps contain only single depth values at each pixel. Attempts to "filter" depth values result in much greater errors in shadow rendering. Thus, to maintain desired error levels in the rendered output, all samples (depth values) obtained for the prior art shadow map must be carried over into the pixel rendering process.

With deep shadow maps, each pixel summarizes a large number of depth samples due to prefiltering of the transmittance functions during the pre-rendering process. When a visibility function is evaluated at a given z value, the result is substantially the same as if percentage-closer filtering was applied to all of the depth samples within the pixel's filter radius. Thus, high-quality filtering can be performed by accessing a much smaller number of pixels during the rendering process.

Prefiltering is important, because sampling error analysis holds for both prior art shadow maps and deep shadow maps. In both cases, a large number of depth samples must be filtered in order to obtain accurate shadows of detailed geometry. While deep shadow maps do not reduce the number of depth samples that must be taken from the scene, deep shadow maps greatly reduce the amount of data that must be accessed during filtering. For example, in order to compute a shadow of dense hair with an expected error of 1%, approximately N=2500 samples per pixel are needed in the prior art methods. Using a deep shadow map with 250 samples per pixel (i.e., 250 samples prefiltered to obtain the visibility function at each pixel), only N=10 pixels need to be processed to achieve a similar accuracy. In contrast, with prior art shadow maps, all 2500 samples must be processed.

Prefiltering not only makes shadow lookups faster, but also allows deep shadow maps to be much smaller than the equivalent high-resolution depth map used in the prior art. This is an advantage when deep shadow maps are written, stored, and cached in memory.

As described, prefiltering allows deep shadow maps to have a much reduced resolution in x and y with respect to prior art shadow maps. Yet, the size of the deep shadow map is not merely a function of the resolution in x and y. The size is also a function of the manner in which each visibility function is represented and stored. For this reason, in one or more embodiments of the invention, visibility functions are compressed. In one compression method described later in this specification, compression is performed with respect to desired error constraints in the function value at each depth. More specifically, error bounds are determined based upon desired percentage error values. The visibility function is then approximated with a minimum amount of data required to stay within those error bounds.

Figure 1:
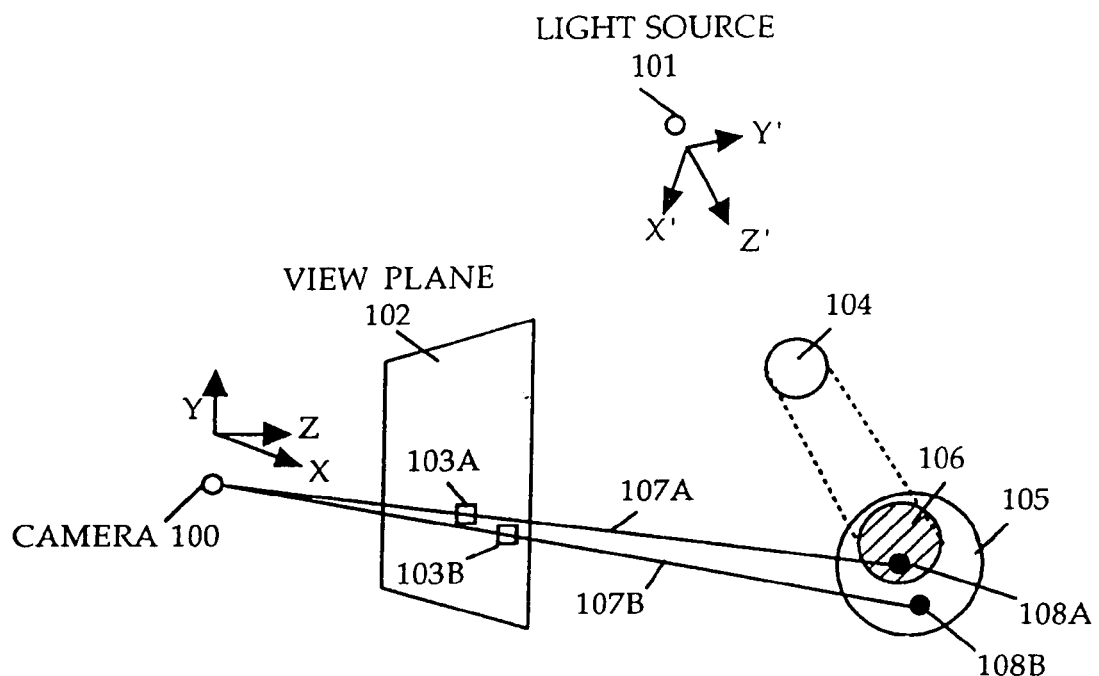
FIG. 1 is a diagram of an image rendering scenario within a modeled object scene.
Figure 2:
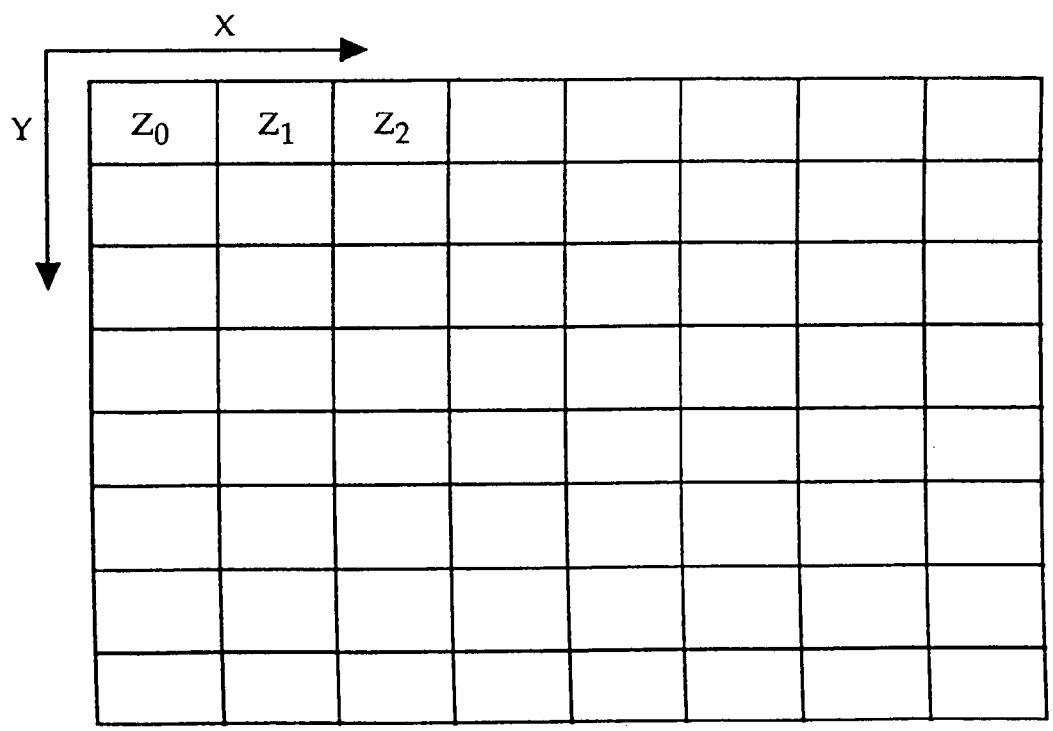
FIG. 2 is a diagram of a shadow map of the prior art.
Figure 3:
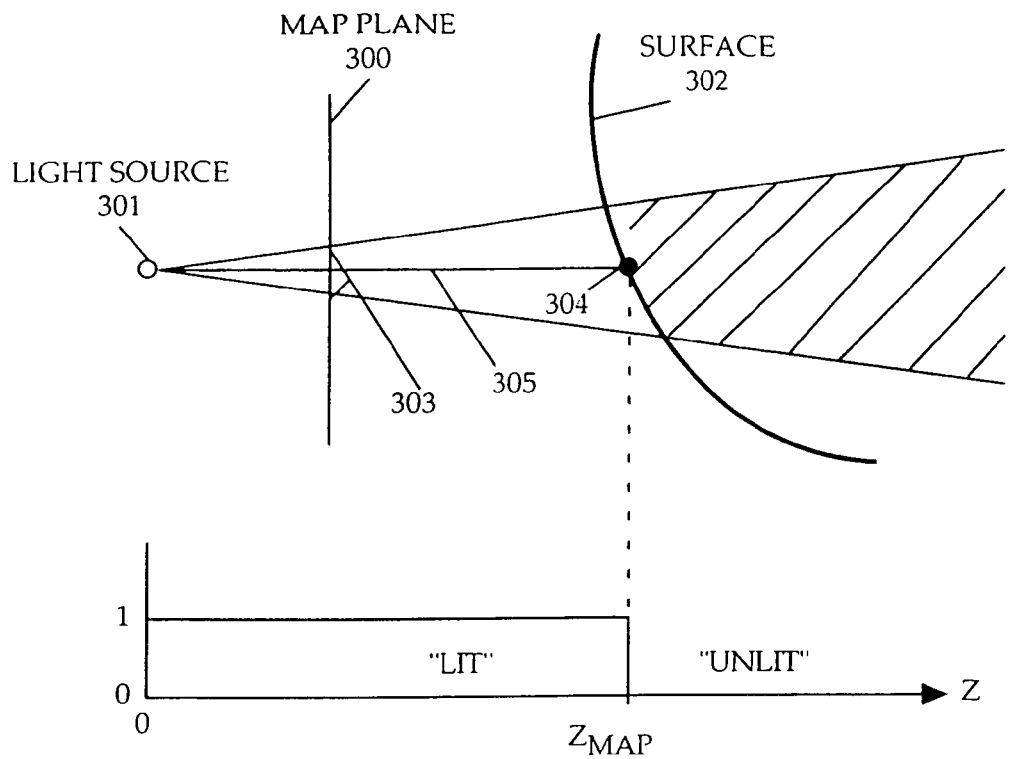
FIG. 3 is a diagram showing ray casting.
Figure 4:
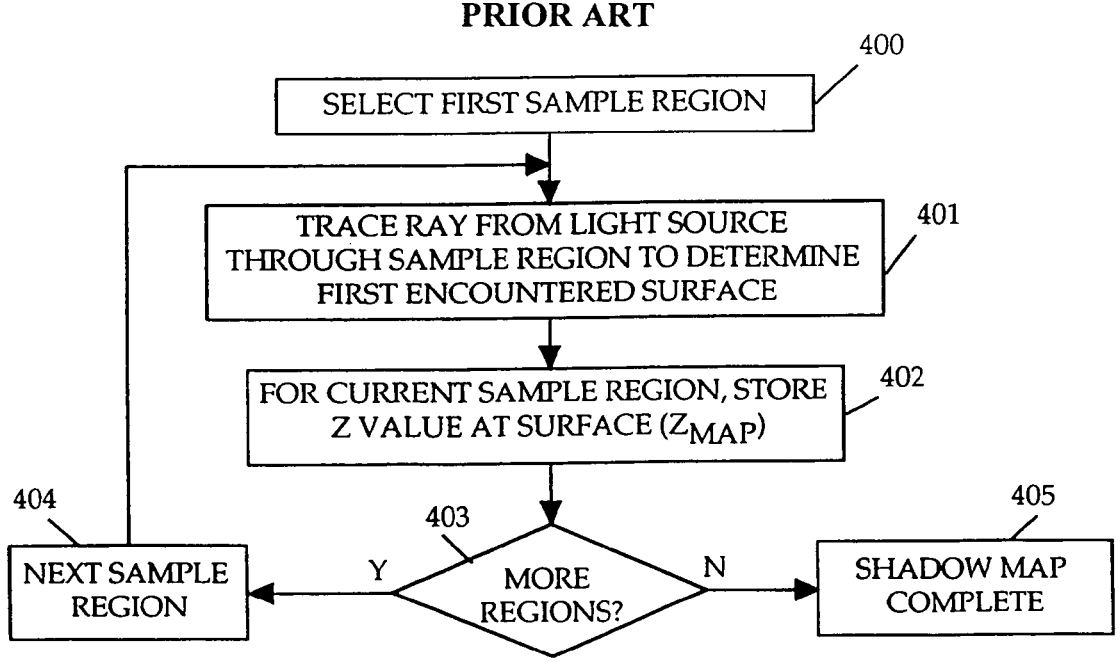
FIG. 4 is a flow diagram of a method for generating a shadow map.
Figure 6A:
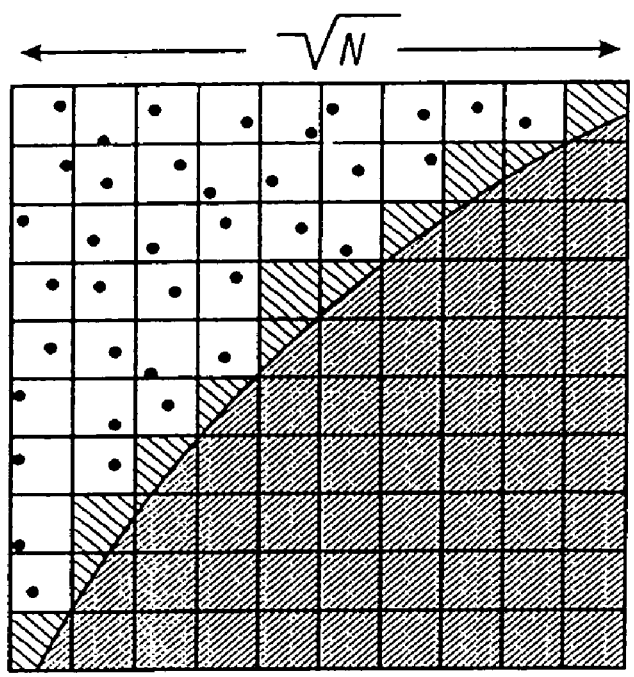
FIG. 6A is a diagram of shadow sampling along a single edge of a silhouette.
Figure 6B:
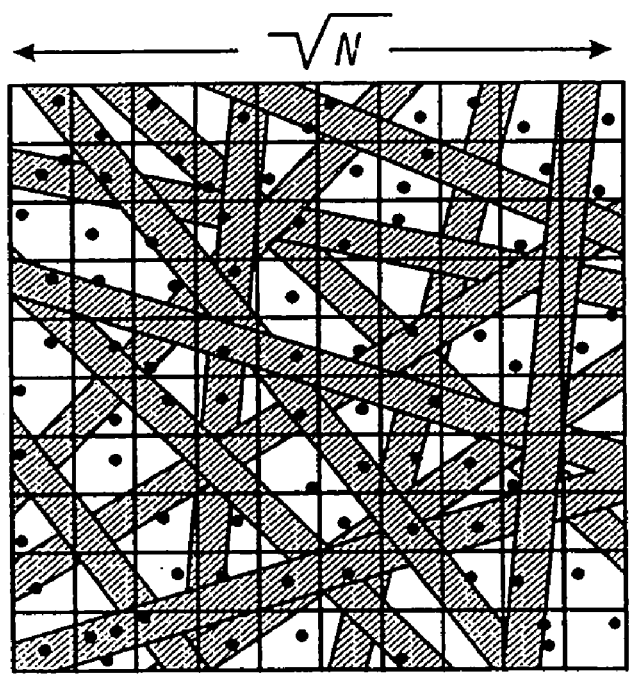
FIG. 6B is a diagram of shadow sampling over a filter region containing many silhouette edges.
Figure 9:
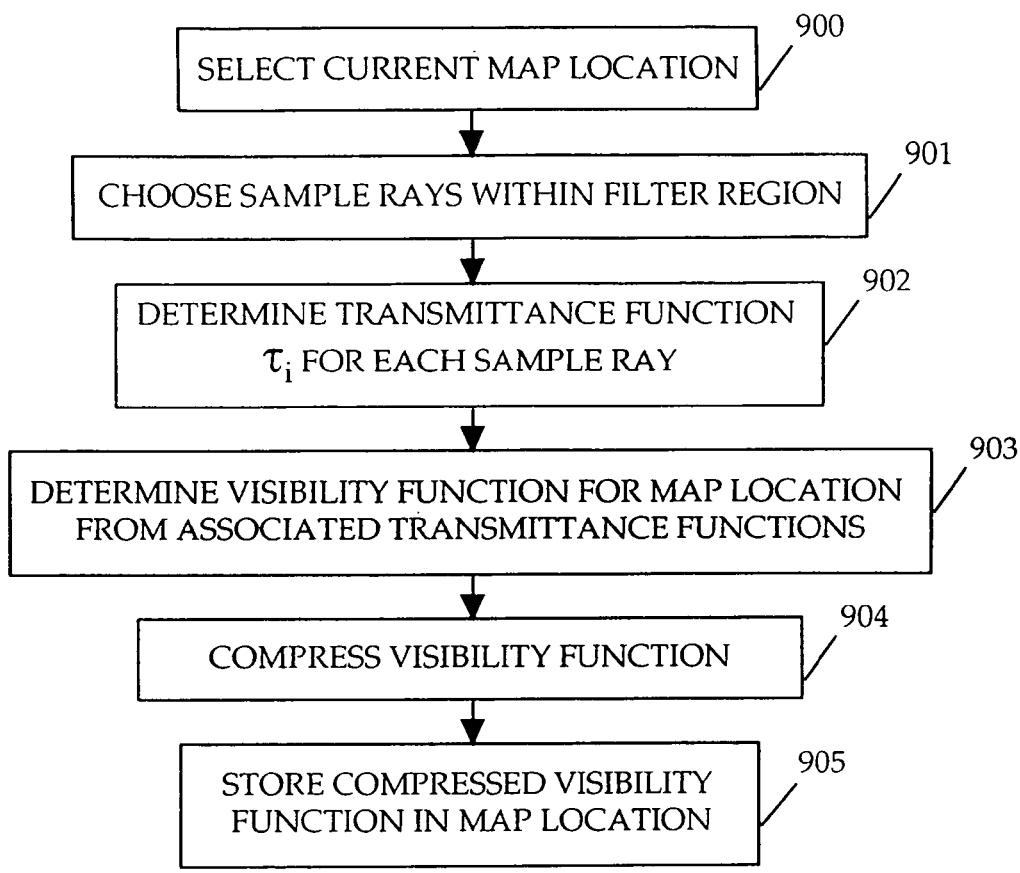
FIG. 9 is a flow diagram of a method for generating a deep shadow map in accordance with an embodiment of the invention.

A general flow diagram of a method for generating a deep shadow map for a light source in accordance with one or more embodiments of the invention is provided in FIG. 9. In step 900, a current map location (pixel) is selected for shadow pre-rendering. In step 901, sample rays are selected from within the corresponding projected filter region of the map location. For each sample ray, the transmittance function $\tau$ is determined in step 902. Each transmittance function $\tau$ accounts for all surfaces and volumes traversed by the respective sample ray. In step 903, all of the transmittance functions are combined to form a single visibility function in z. Combination is achieved, for example, by specifying a two-dimensional filter in x and y, and applying the filter at multiple values of z. In step 904, the resulting visibility function is compressed, and, in step 905, the compressed visibility function is stored in the given map location.

Computation of Fractional Visibility

Each element (e.g., each surface or volume) that affects transmittance along a sample ray may have its own partial transmittance function computed independently. However, it may be computationally more efficient to determine the partial transmittance functions for multiple elements in one process. The total transmittance function along the ray is obtained from the product of those partial transmittance functions. In the embodiment described below, a single surface transmittance function is computed that accounts for all surface elements traversed by the ray. A separate volume transmittance function is computed that accounts for all volumetric elements. Other embodiments of the invention may compute transmittance functions for the elements traversed by the ray either individually or in any combination.

Figure 11A:
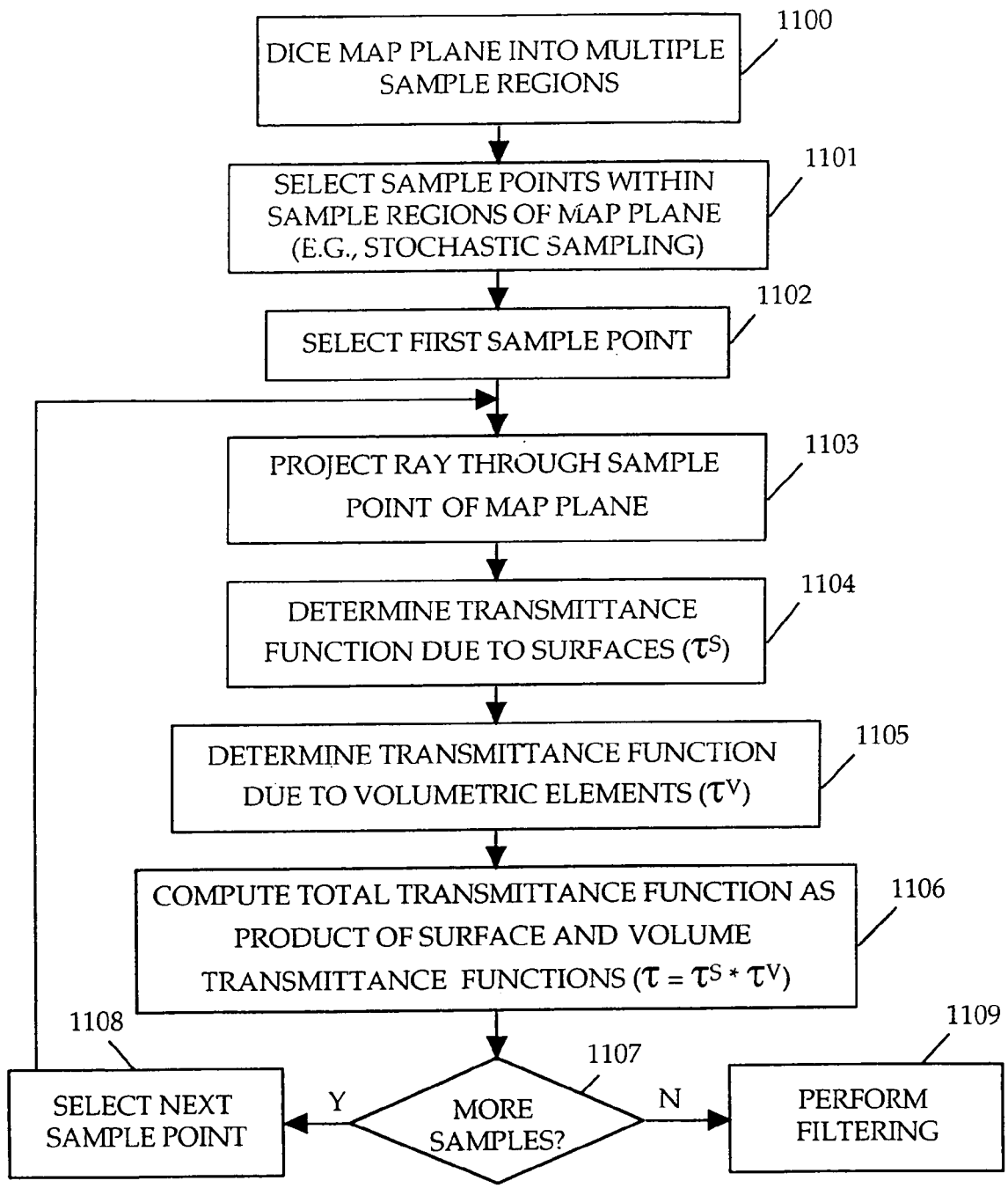
FIGS. 11A–11D are flow diagrams of a method for determining transmittance in accordance with an embodiment of the invention.

A method for determining a visibility function from multiple transmittance functions is described below with reference to FIGS. 11A–11D. In FIG. 11A, in step 1100, the map plane is diced into multiple sample regions, e.g., as a grid. This assures a minimum sample spacing for better coverage of each filter region. In step 1101, one or more sample point(s) is selected within each sample region. A simple technique is to sample at the center of each sample region, though other sample point distribution approaches (e.g., stochastic or "pseudo-random" sampling) may be used to improve sampling quality. In step 1102, a first sample point is selected for determination of its corresponding transmittance function. The order in which sample points are processed may vary. However, scanline rendering processes may be used to facilitate this operation, in which case the sample points are selected in scanline order. Note that the transmittance functions for all sample points need not be concurrently stored in memory. If pixels are processed in scanline order, it is sufficient to store enough scanlines to span the width of the applied filter function.

In step 1103, for the current sample point in the map plane, a ray is projected from the light source through the sample point to cross the object scene. In step 1104, a surface transmittance function $\tau^S$ is determined that accounts for each surface intersected by the ray. The surface intersections can be found using either a ray tracer or an ordinary scan conversion renderer, for example. In step 1105, a volume transmittance function $\tau^V$ is determined that accounts for each volumetric object traversed by the ray. Steps 1104 and 1105 may be performed in any order, or in parallel. In step 1106, the transmittance function of the sample point $\tau$ is determined from the product of the surface transmittance function $\tau^S$ and the volume transmittance function $\tau^V$.

In step 1107, if there are more samples to process, the next sample point is selected in step 1108, and the method returns to step 1103. If, however, in step 1107, no further samples need processing (e.g., sufficient scanlines are processed to perform filtering for a row of map locations), in step 1109, filtering is performed to obtain visibility functions for corresponding map locations.

Figure 11B:
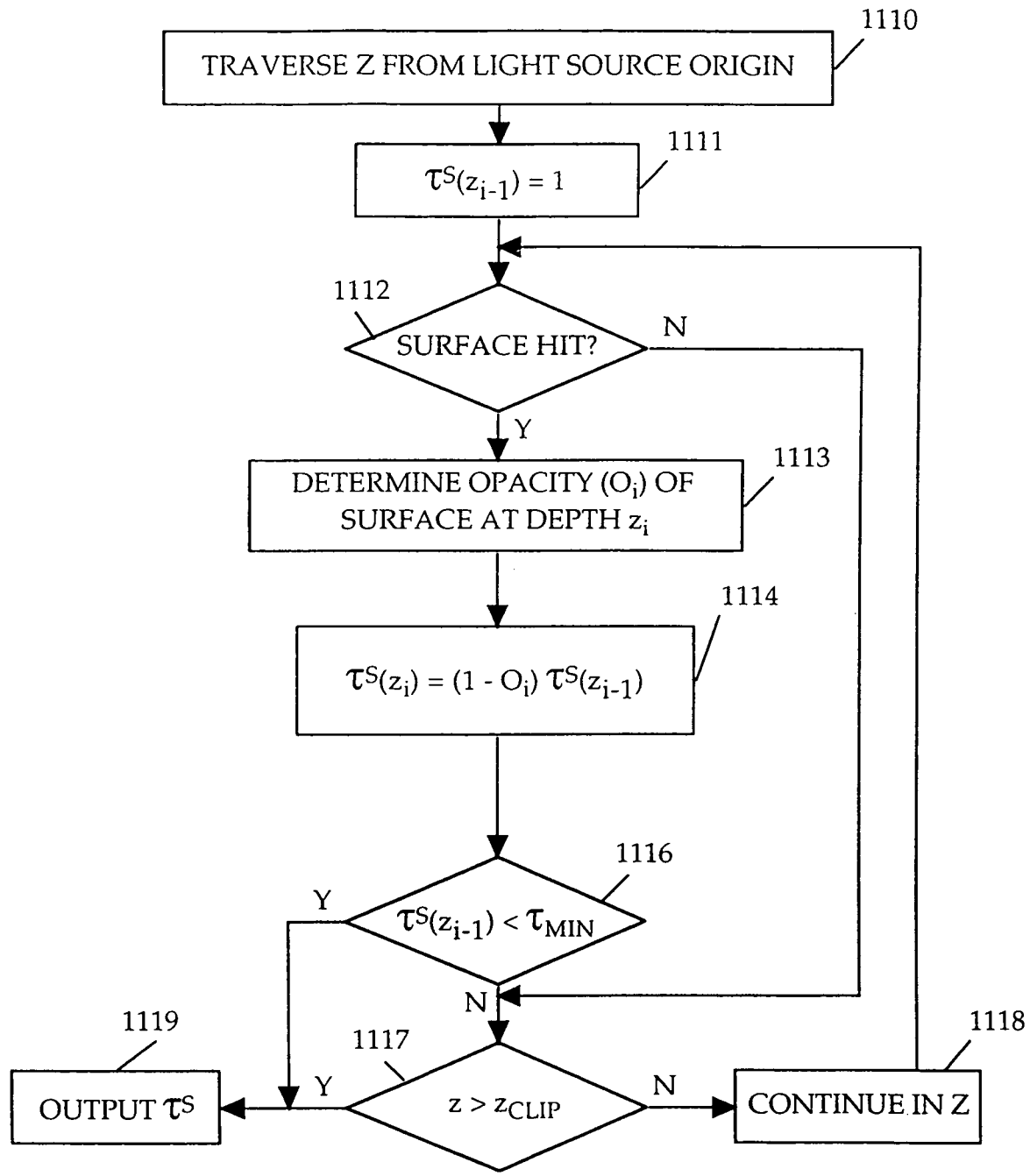

The step of determining the surface transmittance $\tau^S$ is described in more detail below with reference to the flow diagram of FIG. 11B. In step 1110, the projected ray is traversed in z from the light source origin. In step 1111, the initial value of the surface transmittance function $\tau^S(z_{i-1})$ is set equal to "1".

In step 1112, if there is a "surface hit" (i.e., the ray intersects a surface), the method proceeds to step 1113;

otherwise, the method proceeds to step 1117. In step 1113, the surface characteristics are queried to determine the opacity $O_i$ of the surface where the ray intersects at depth $z_i$. In step 1114, the transmittance value at $z_i$ is is determined as follows, to account for the opacity of the surface:

$$\tau^S(z_i)=(1-O_i)\tau^S(z_{i-1})$$

Step 1116 is an optional step for ending traversal in z, once the computed transmittance function falls below a threshold value. If $\tau^S(z_{i-1})$ is less than a threshold value $\tau_{MIN}$, then the computed surface transmittance function is output at step 1119. The threshold value may be predicated on an acceptable error range (e.g., conservatively assuming multiplication by a maximum value ("1") of the volume transmittance function). Once this threshold is met, it may be unnecessary to continue evaluating surface effects along this ray, especially if the last surface was opaque ($O_i=1$). If the threshold is not met in step 1116, or if step 1116 is not implemented, the method proceeds to step 1117.

In step 1117, the current depth value is compared with a depth threshold value $z_{CLIP}$, such as the depth of a rendering clipping plane. If the depth threshold has not been met or all the surfaces have not been sampled, the method continues traversal in z in step 1118, and returns to step 1112. If, in step 1117, the depth threshold is met or all the surfaces have not been sampled, the computed surface transmittance function $\tau^S$ is output in step 1119.

In one or more embodiments, the surface and volume transmittance functions, as well as the visibility function, are approximated with piecewise linear functions. By approximating the functions in this manner, it is possible to fully describe those functions with a sequence of vertices, in which each vertex identifies a particular depth value $z_i$ and a function value at that depth (e.g., $\tau^S(z_i)$). In the case of the surface transmittance function, each discontinuous step caused by a surface hit may be represented by a pair of vertices having the same depth value but two different function values representing the value prior to the surface hit and the value subsequent to the surface hit. This representation results in wasted space, however, the wasted space is removed during the compression process. Note that a true step in the compressed output function would occur only for surface parallel to the xy-plane. The vertices at $z=0$ and $z=\infty$ are represented implicitly, and are not part of the output.

Figure 11C:
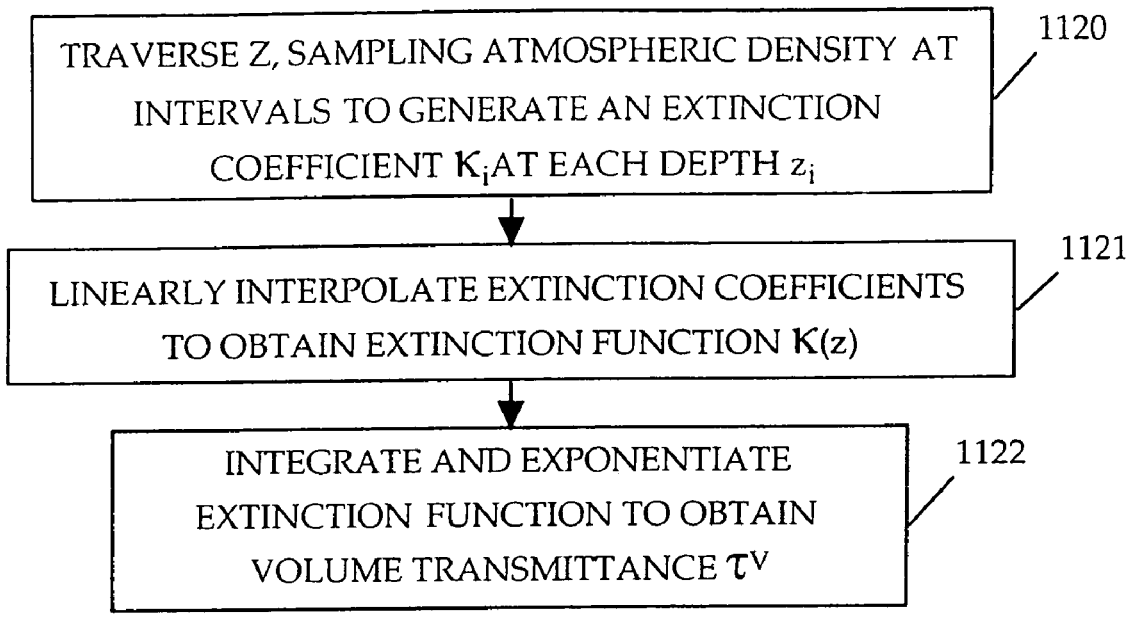

The step of determining the volume transmittance function $\tau^V$ is described in further detail below with reference to the flow diagrams of FIGS. 11C–11D. At step 1120, traversing in z, the atmospheric density is sampled at regular intervals along the projected ray to determine an extinction coefficient $\kappa_i$ at each depth $z_i$. The extinction coefficient measures the light falloff per unit distance along the ray. It is assumed that the atmospheric density of a volumetric element may be obtained (or derived) for any location in the scene. At depths where the projected ray does not lie within a volumetric element, the extinction coefficient is zero. The extinction function $\kappa(z)$ is obtained by linearly interpolating from the extinction coefficients in step 1121.

The fraction of light that penetrates to a given depth z, i.e., the volume transmittance function $\tau^V(z)$, is computed at step 1122 by integrating and exponentiating the extinction function as follows:

$$\tau^V(z) = \exp\left(-\int_0^z \kappa(z')dz'\right)$$

Figure 11D:
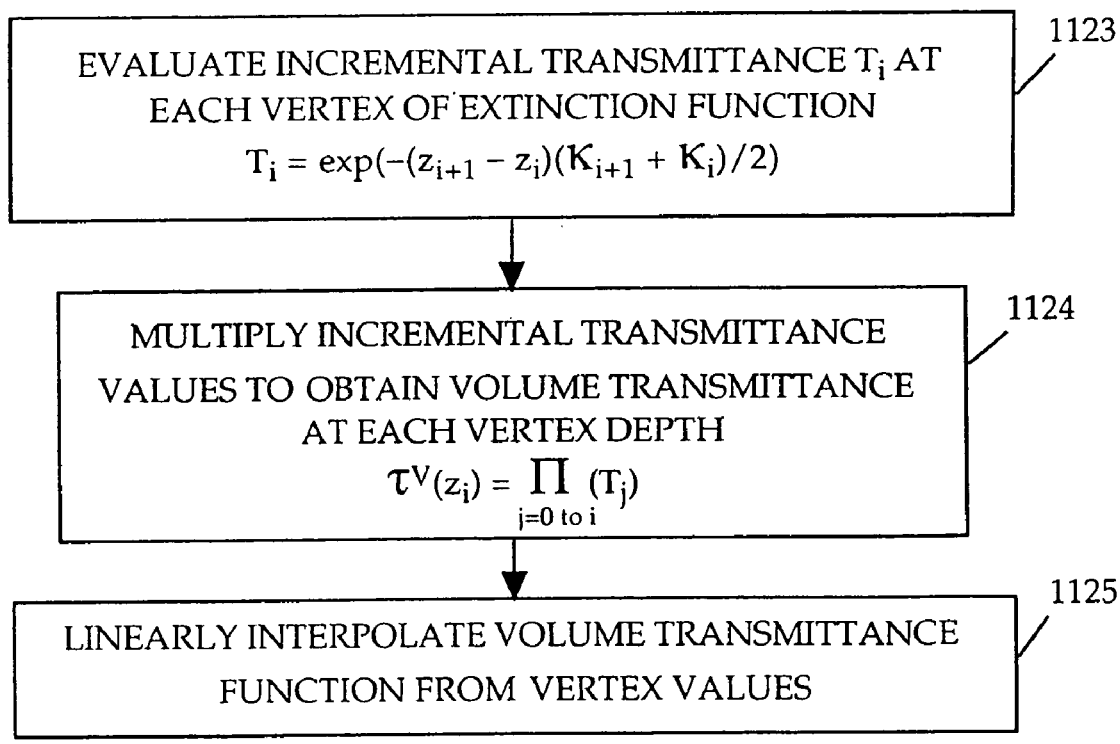

While step 1122 may be carried out by computing the integral of the extinction function directly, a simpler approximation method that yields a more tractable piecewise linear function is shown in FIG. 11D.

The method of FIG. 11D evaluates the transmittance value at each vertex of the extinction function, so that the volume transmittance function can be linearly interpolated from those transmittance values. In step 1123, the incremental transmittance for each linear segment of the extinction function is calculated from the vertex extinction coefficients as follows:

$$T_i=\exp(-(z_{i+1}-z_i)(\kappa_{i+1}+\kappa_i)/2)$$

Using the incremental transmittance values, the volume transmittance function at those vertex locations is determined in step 1124 by multiplying the incremental transmittance values together. The volume transmittance at each vertex is given by:

$$\tau^V(z_i) = \prod_{j=0}^{i}(T_i)$$

In step 1125, the volume transmittance function $\tau^V$ is linearly interpolated from the computed values for $\tau^V(z_i)$.

Figure 10:
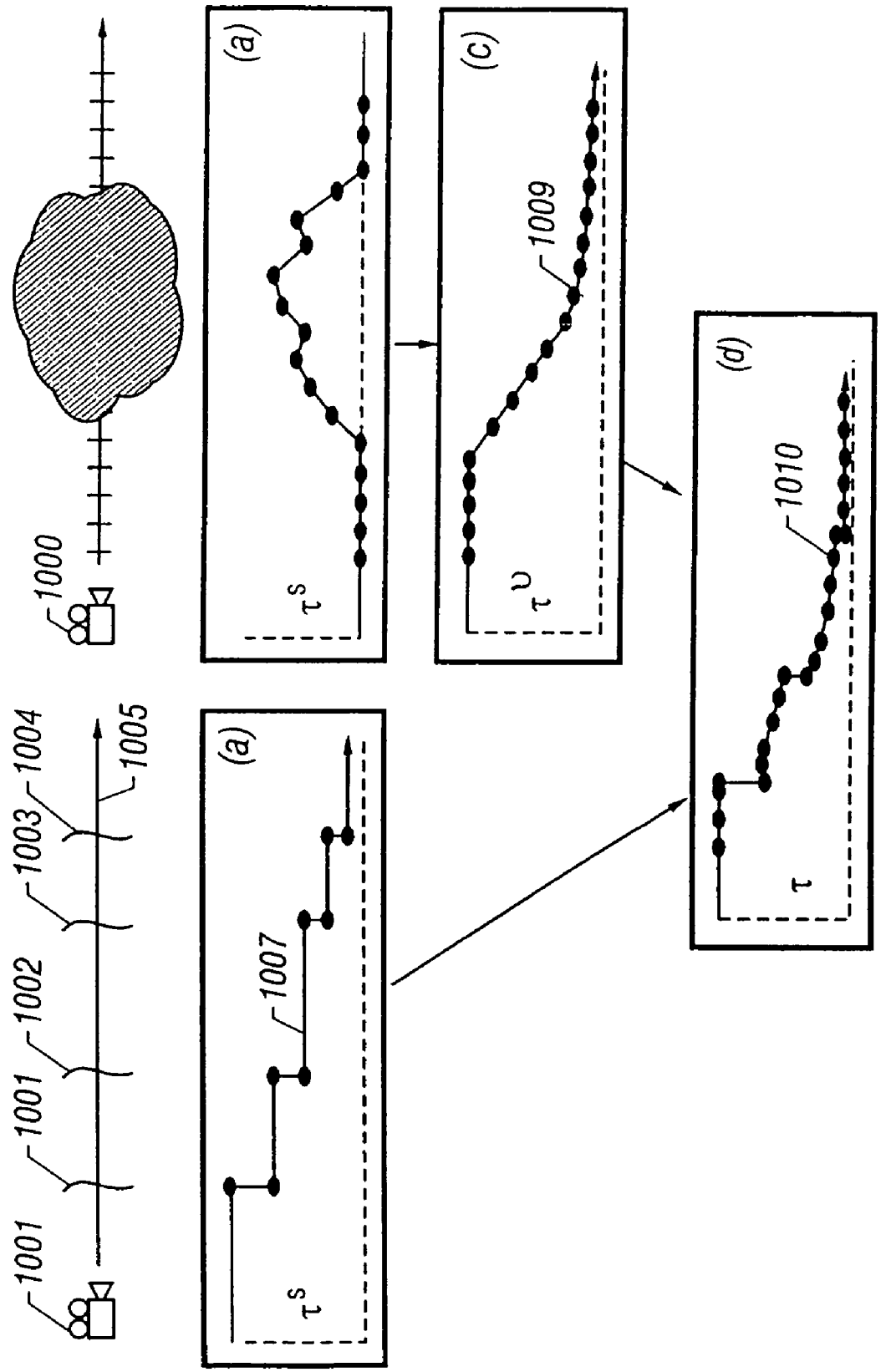
FIG. 10 is a diagram illustrating the generation of a transmittance function in accordance with an embodiment of the invention.

An example application of the methods described above is illustrated in the diagram of FIG. 10, with respect to generation of a transmittance function from a sample ray. In this example, a sample ray 1005 is projected from light source 1000. In traversing the object scene, sample ray 1005 intersects four surfaces 1001–1004, as well as a volumetric element 1006.

Function 1007 represents the piecewise constant surface transmittance function $\tau^S$ obtained by evaluating the surface effects at the intersections with surfaces 1001–1004. At the depth of each surface hit, the surface transmittance function experiences a corresponding downward step, the magnitude of which is based on the opacity of the intersected surface. Each step is represented by two vertices. Thus, the surface transmittance for ray 1005, which intersects a total of four surfaces, is fully represented by eight vertices.

Function 1008 represents the piecewise linear extinction function κ obtained by sampling the atmospheric density of element 1006 along ray 1005. Function 1009 represents the volume transmittance function $\tau^V$ obtained by integrating and exponentiating the extinction function 1008. Functions 1008 and 1009 share the same vertex depth locations.

Function 1010 is the total transmittance function τ obtained by multiplying functions 1007 and 1009 together. To simplify the calculation, multiplication is performed only at depths where at least one of functions 1007 and 1009 has a vertex. Where one function has a vertex and the other does not, a function value is interpolated from the nearby vertices. Note that the number of vertices in the output transmittance function 1010 is equal to the sum of the number of vertices in functions 1007 and 1009.

Filtering Implementation

As previously alluded to, individual transmittance functions are combined to form a single visibility function by means of a two-dimensional filter. The application of the filter is generally described by the following equation:

$$V_{i,j}(z) = \sum_{k=1}^{n} \omega_k \tau_k(z)$$

where "n" is the number of transmittance functions within the filter radius around $(i+\frac{1}{2}, j+\frac{1}{2})$, and $\omega_k$ is the normalized filter weight for the corresponding image sample point $(x_k, y_k)$. The resulting visibility function $V_{i,j}$ accounts not only for the light attenuation due to semitransparent surfaces and volumetric objects such as fog. By virtue of the spatial sampling in x and y, the visibility function also accounts for the fractional coverage of these features.

An example of a 4×4 filter is shown in FIG. 12. The center of the coefficient grid represents the center of the filter region $(i+\frac{1}{2}, j+\frac{1}{2})$. Those samples closest to the center are scaled by coefficient "A." Samples within the grid areas beyond the "A" regions in the x or y direction are scaled by coefficient "B," whereas samples in the grid areas at the outside corners are scaled by coefficient "C." Filter coefficients applied to the transmittance functions are typically weighted towards the center of the filter region (i.e., A>B>C). The output of the filter is normalized by dividing the summed result by the sum of the filter coefficients, which, for this example, is 4A+8B+4C. The output of the filter is thus a weighted average of the input transmittance functions at each depth z. Note that other filtering methods could be used, including those in which the filter value depends on the substratum sample location.

A general method for filtering the transmittance samples is illustrated in the flow diagram of FIG. 13A. The light transmitted at the source (i.e., z=0) is transmitted by definition with a transmittance of "1" for any sample point. Thus, in step 1300, the visibility value V(0) is set to "1." In step 1301, the set of vertices for all of the transmittance functions that fall within the filter region is identified and sorted in depth order, and, in step 1302, a first vertex is selected from the set.

In step 1303, the depth $z_i$ of the current vertex is determined, and, in step 1304, the filter is applied to all transmittance functions at that depth to determine the corresponding visibility value $V(z_i)$. The result is stored as an output vertex $(z_i, V(z_i))$. Application of the filter entails interpolating each transmittance value at depth $z_i$, scaling each transmittance value by the corresponding filter coefficient, summing all of the scaled values, and dividing the result by the sum of the coefficients.

In step 1305, if there are more vertices to process, then the next vertex is selected in step 1306, and the process returns to step 1303. However, if there are no further vertices to consider in step 1305, filtering is completed. The visibility function V(z) is the piecewise linear function defined by the computed output vertices.

Although each visibility function is piecewise linear, it has as many vertices as all of the contributing transmittance functions combined. This means that as the number of sample points within the filter region increases, the number of vertices at which the filter must be applied increases proportionally. Further, the number of computations needed in a single pass of the filter also increases substantially proportional to n (i.e., there are n samples to be interpolated, scaled and summed). Thus, the complexity of the filtering operation to obtain the visibility function over all depths is a function of $n^2$.

Though the filtering method of FIG. 13A is functional, and may be used in embodiments of the invention, an alternative method is preferred for which the cost increases much less rapidly with the size of the filter. The alternative method employs incremental updates with a constant update cost per vertex.

If the transmittance functions are piecewise constant, the output function can be efficiently computed as follows. At z=0, the weighted average is computed as V(0)=1. All of the input vertices are then processed in increasing z order, which can be done in O(log n) time per vertex by storing the next vertex of each transmittance function in a heap. For every vertex, the current visibility sum is updated by subtracting out the corresponding transmittance function's old contribution and adding in its new contribution. That is, $$V' = V + \omega_j(t'_j - t_j)$$

where V is the old visibility function value, V' is the updated visibility function value, $\omega_j$ is the filter weight for the chosen transmittance function, $t_j$ is the old value of the transmittance function and $t'_j$ is its new value. The values of the other transmittance functions are not needed until one of their respective vertices is processed.

Figure 13B:
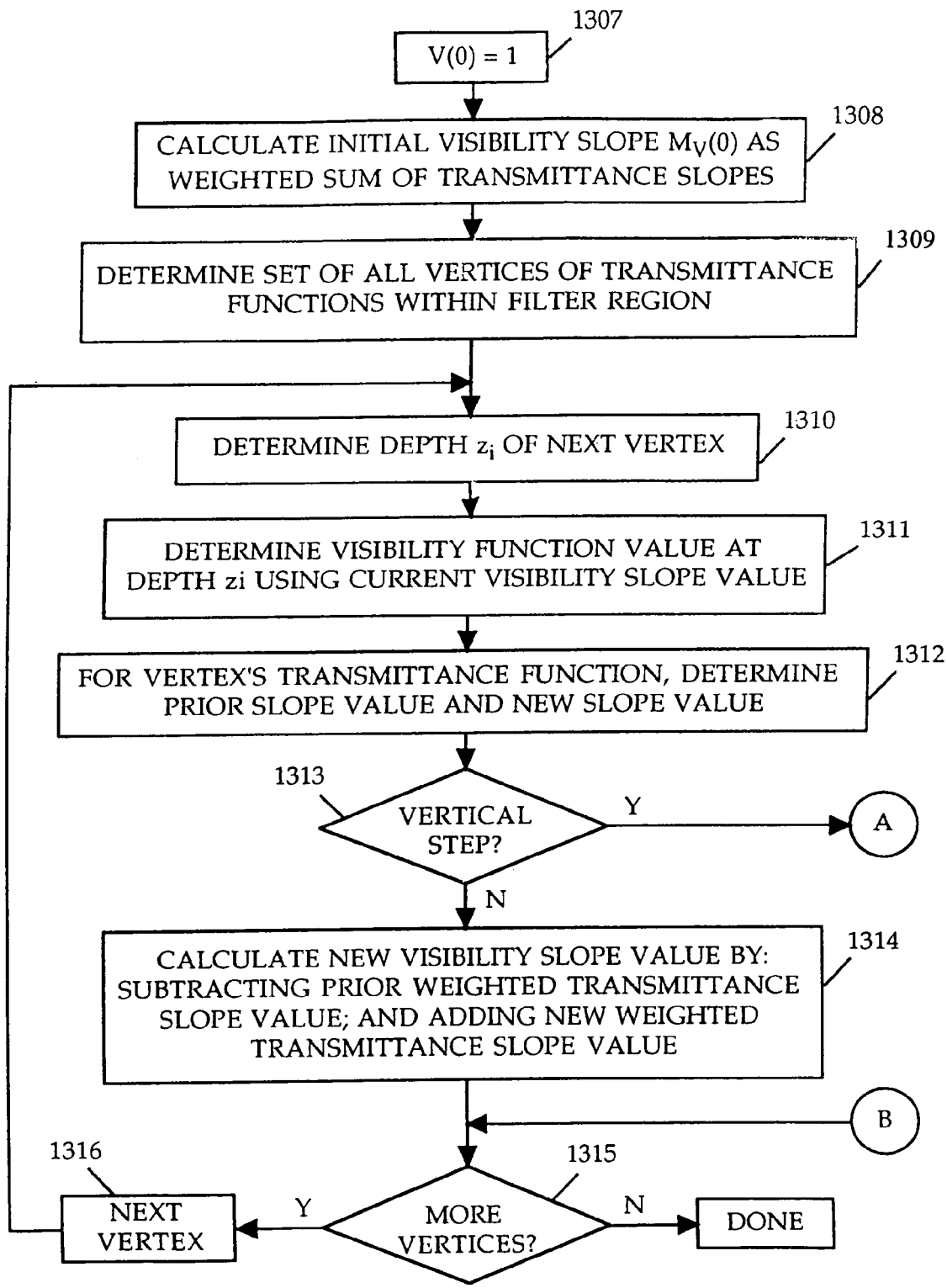
Figure 13C:
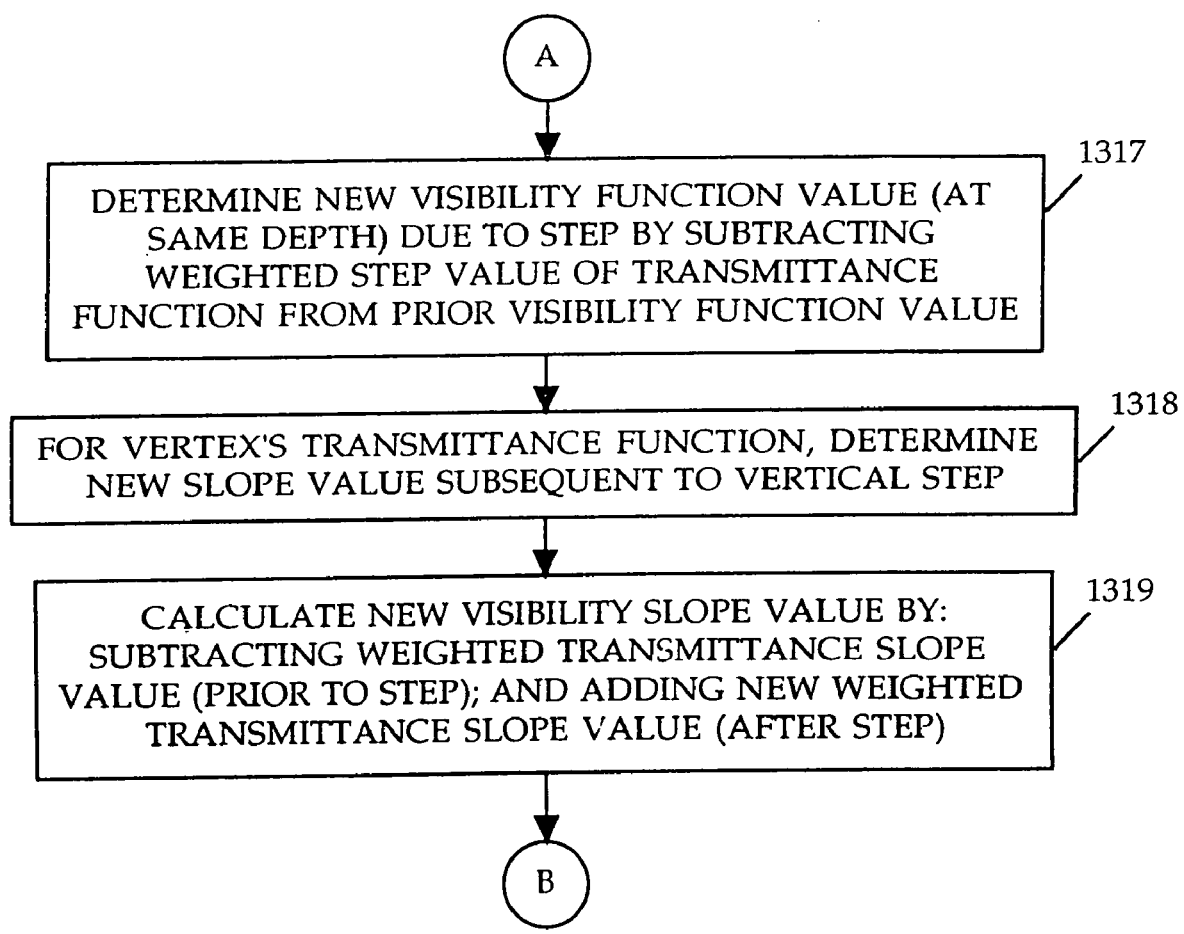

The above method may be applied where each of the transmittance functions is piecewise constant. However, in many circumstances (e.g., where volumetric effects are considered), the transmittance functions are not piecewise constant, merely piecewise linear. For piecewise linear functions, the filter process keeps track of the output visibility function's current value and slope. The update for each vertex consists of two steps: extending the output function, using its current position and slope, to the z value of the next input vertex; and updating the current output slope. FIGS. 13B–13C provide a flow diagram of a method for filtering piecewise linear transmittance functions in accordance with one or more embodiments of the invention.

In step 1307 of FIG. 13B, the initial visibility value is set to "1." In step 1308, the initial slope $M_V(0)$ of the visibility function is calculated as the weighted sum of the initial transmittance slopes $M^{\tau}_n(0)$, where the transmittance slope is given by:

$$M^{\tau}_n(z_i) = (\tau(z_{i+1}) - \tau(z_i))/(z_{i+1} - z_i)$$

and the initial visibility function slope $M_V(0)$ is:

$$M_V(0) = \sum_{k=1}^{n} \omega_k M^{\tau}_k(0)$$

In step 1309, the set containing all vertices of the filtered transmittance functions is determined and sorted in increasing depth order. In step 1310, the depth $z_i$ of the next vertex in the set is determined. The visibility value at depth $z_i$ is then computed in step 1311 based on the current visibility function value and slope value:

$$V(z_i) = V(z_{i-1}) + M_v(z_{i-1}) \cdot (z_i - z_{i-1})$$

In step 1312, for the transmittance function associated with the current input vertex, the prior slope value and new slope value are determined. (The prior slope value may be stored in a temporary register allocated to each transmittance function for that purpose. The temporary register is updated with the new slope after the vertex is processed.) In step 1313, if the current transmittance vertex reflects a vertical step (e.g., depth matches that of next vertex), then the process continues at step 1317 of FIG. 13C; otherwise, a new visibility slope value is calculated subtracting the prior weighted slope of the transmittance function and adding the weighted new slope of the transmittance function as follows:

$$M_v(z_i) = M_v(z_i) - \omega_n[M_n^\tau(z_{i-1}) - M_n^\tau(z_i)]$$

In step 1315, if there are more vertices in the input set, the next vertex is selected in step 1316, and the process returns to step 1310; otherwise, the filtering process is complete for this map location.

Steps 1317–1319 of FIG. 13C are implemented to handle vertical steps of the input transmittance functions. The result is that both input vertices defining the vertical step are processed, and two output vertices are generated. In step 1317, a second visibility function value is determined at the same depth $z_i$ by subtracting the weighted step value of the transmittance function from the prior visibility function value (as described for piecewise constant functions). In step 1318, the slope value of the transmittance function, subsequent to the vertical step, is computed. The new visibility slope value is calculated in step 1319 by subtracting the weighted transmittance slope value prior to the vertical step and adding the weighted transmittance slope value subsequent to the vertical step. From step 1319, the process continues at step 1315 of FIG. 13B.

The above technique is much more efficient than computing the weighted averages directly (as described with respect to FIG. 13A), and makes the filtering process practical even when very large numbers of samples per map location are used.

Compression of Visibility Functions

The raw visibility functions output from the filter process described above may have a large number of vertices, depending on the filter radius and the number of samples per map location. However, the raw visibility functions are are generally quite smooth, making compression a viable option. The compressed functions are stored as an array of floating-point pairs, each containing a z value and a fractional visibility V.

It is desirable that the compression method preserve depth values, since even small errors in z can lead to undesirable self-shadowing artifacts. The compression method should also be appropriate for unbounded domains ($z \in [0,\infty)$). In one or more embodiments of the invention, the $L_\infty$ error metric (maximum error) is used to compress functions as described below.

Figure 15A:
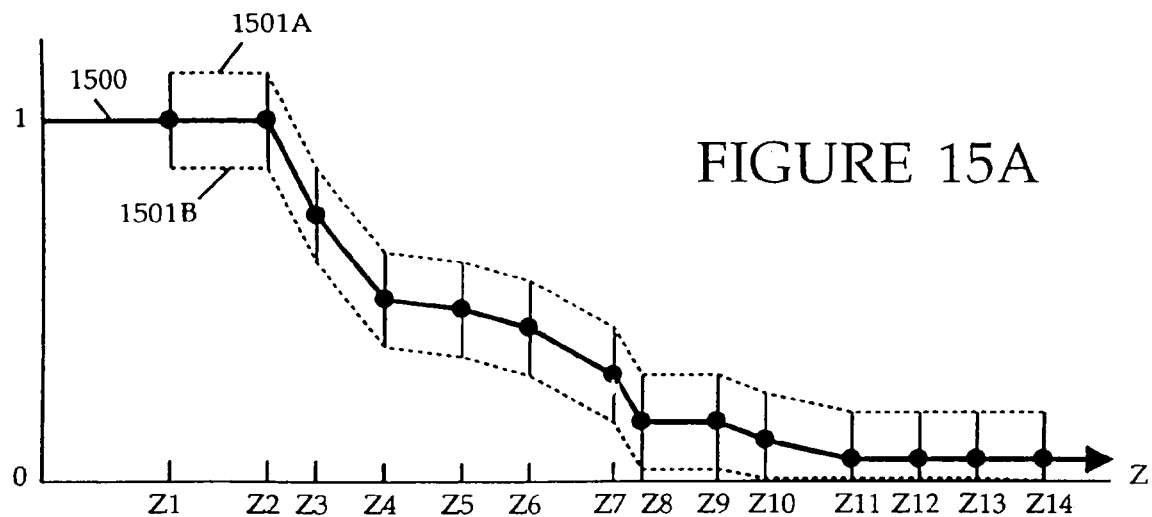
FIGS. 15A–15G are diagrams illustrating the compression of a visibility function, in accordance with an embodiment of the invention.
Figure 15B:
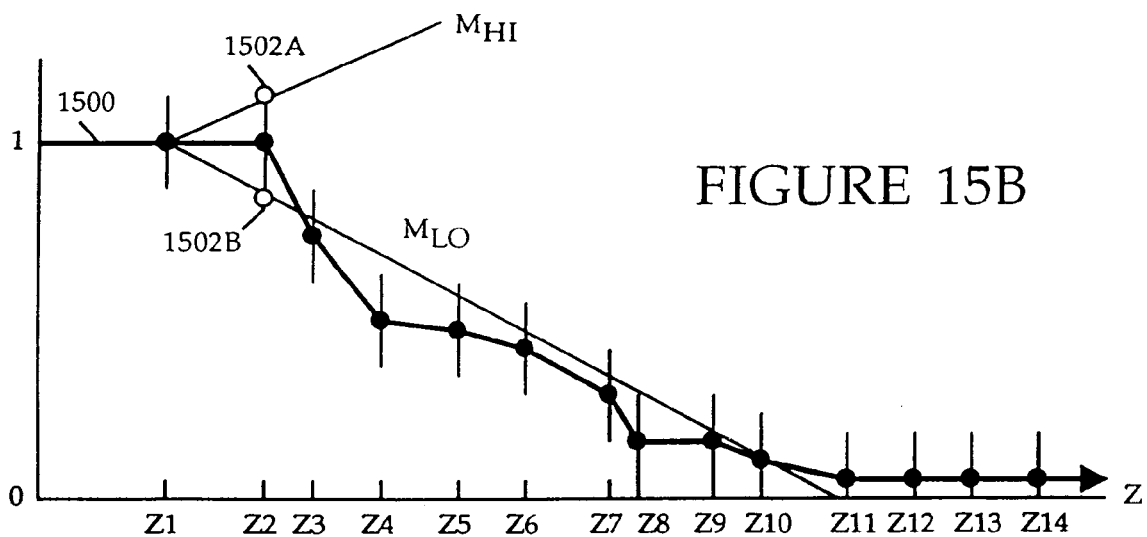
Figure 15C:
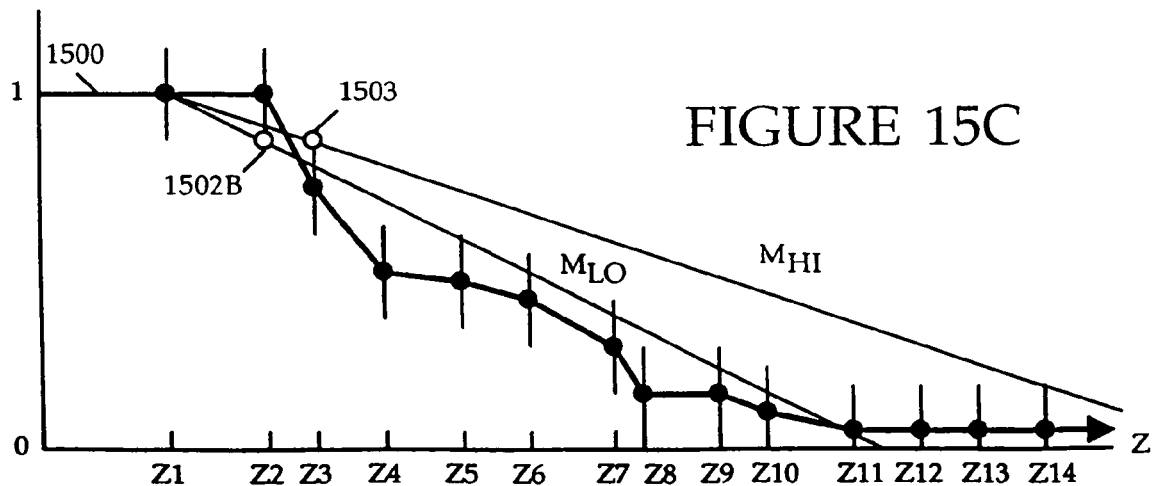

Given a visibility function V and an error tolerance $\epsilon$, the compression method outputs a new visibility function V' such that $$|V'(z) - V(z)| \leq \epsilon \text{ for all } z$$

where V' typically has a much smaller number of control points or vertices. One aspect of this approach is that it is incremental. Vertices are read and written one at a time in increasing z order, and only a constant amount of state information is used. FIGS. 15A and 15G illustrate the difference in the visibility function before and after compression, respectively.

The general technique is to draw the longest possible line segment that stays within the error bounds. The origin of the current segment is fixed, so that only the direction and length of the segment need to be chosen. To simplify the implementation, the output z values may be restricted to be a subset of the input z values. In one or more embodiments of the invention, the output z values are restricted to be a subset of the input z values.

Let the origin of the current output segment be $(z'_i, V'_i)$. At every step, a range of permissible slopes $[M_{LO}, M_{HI}]$ for the segment is maintained. Each new control point $(z_j, V_j)$ of the input function V imposes a constraint on the current slope range, by forcing the segment to pass through the target window defined by the wedge from the segment origin to the two points $(z_j, V_j \pm \epsilon)$. The current slope range is initialized to $[-\infty, \infty]$, and is intersected with each target window in succession until further progress would make it empty. The output is the line segment with slope $(M_{LO} + M_{HI})/2$ terminating at the z value of the last control point visited. The endpoint of this segment becomes the origin of the next segment, and the entire process is repeated. Using the average of $M_{LO}$ and $M_{HI}$ helps to center the endpoint within the allowable error bounds, though any slope within the slope range would satisfy the error constraints. It would be evident to one of ordinary skill in the art that other methods (e.g., least square fit) could be used once the z values of the control points have been chosen.

Figure 14:
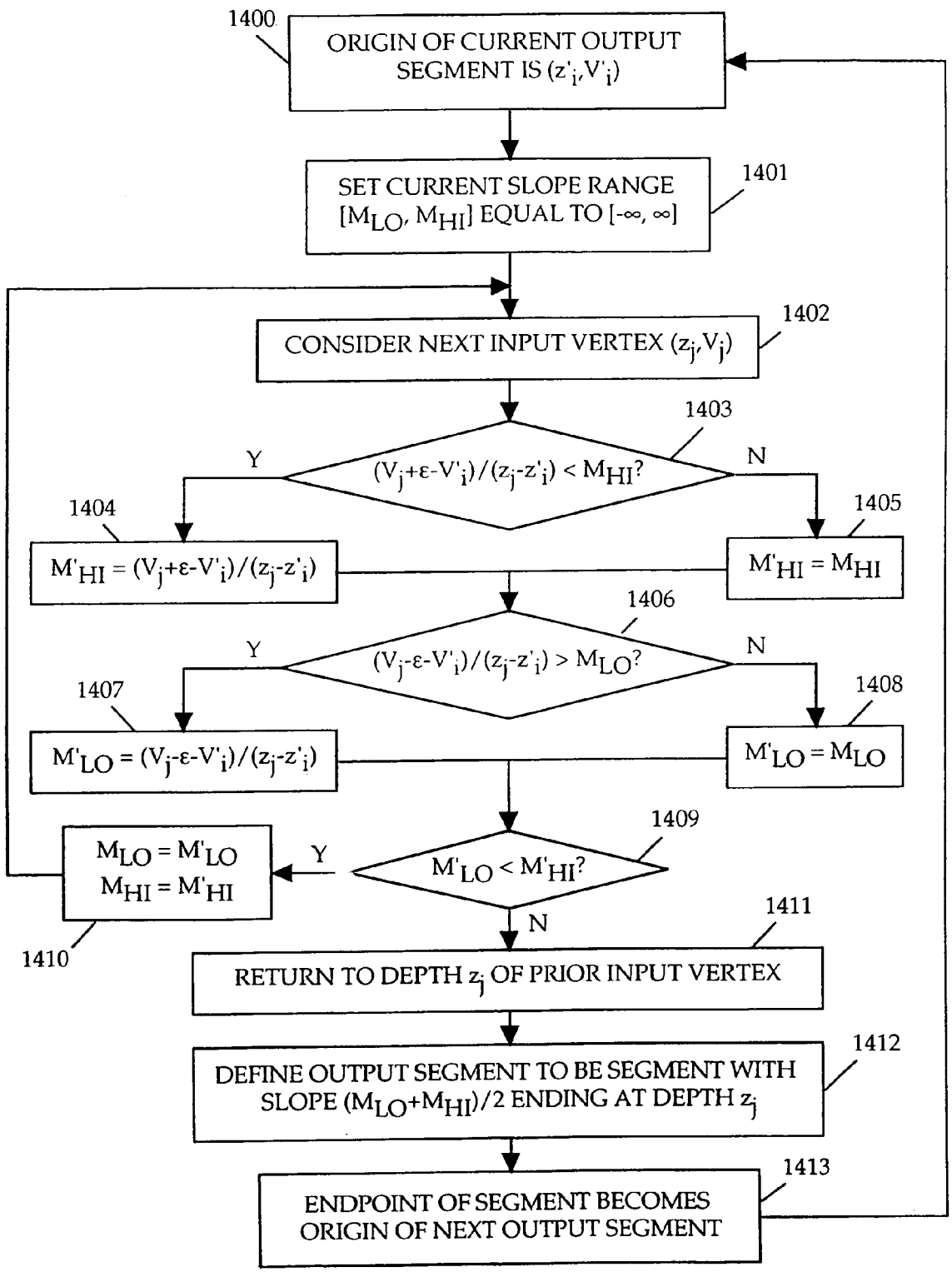
FIG. 14 is a flow diagram of a method for performing compression of a visibility function in accordance with an embodiment of the invention.

A flow diagram of the compression method, in accordance with one or more embodiments of the invention, is shown in FIG. 14. In step 1400, the origin of the current output segment is set to $(z'_i, V'_i)$, and, in step 1401, the current slope range $[M_{LO}, M_{HI}]$ is initialized to $[-\infty, \infty]$. In step 1402, the next raw input vertex $(z_j, V_j)$ is selected for consideration.

In step 1403, a maximum test slope $M^+$ computed using the upper error bound on the current vertex is compared to the current maximum slope $M_{HI}$, where the maximum test slope is given as:

$$M^+ = (V_j - V'_i)/(z_j - z'_i)$$

If the maximum test slope $M^+$ is less than the maximum slope $M_{HI}$, then a provisional maximum slope value $M'_{HI}$ is set equal to $M^+$ in step 1404, before proceeding to step 1406. Otherwise, in step 1403, if the maximum test slope $M^+$ is greater than $M_{HI}$, then the provisional maximum slope $M'_{HI}$ is set equal to $M_{HI}$ in step 1405, prior to proceeding to step 1406.

In step 1406, a minimum test slope $M^-$ computed using the lower error bound on the current vertex is compared to the current minimum slope $M_{LO}$, where the minimum test slope is given as:

$$M^- = (V_j - V'_i)/(z_j - z'_i)$$

If the minimum test slope $M^-$ is greater than the minimum slope $M_{LO}$, then a provisional minimum slope value $M'_{LO}$ is set equal to $M^-$ in step 1407, before proceeding to step 1409. Otherwise, in step 1406, if the minimum test slope $M^-$ is less than $M_{LO}$, then the provisional minimum slope $M'_{LO}$ is set equal to $M_{LO}$ in step 1408, prior to proceeding to step 1409.

In step 1409, the provisional minimum slope value $M'_{LO}$ is compared to the provisional maximum slope value $M'_{HI}$. If $M'_{LO}$ is less than (or equal to) $M'_{HI}$, then the provisional slope range is nonzero, and, in step 1410, the provisional maximum and minimum slope values, $M'_{HI}$ and $M'_{LO}$, become the new maximum and minimum slope values, $M_{HI}$ and $M_{LO}$. Step 1410 then returns to step 1402 to consider the next raw input vertex. (If there are no other input vertices, the process jumps to step 1412 to determine the last output vertex.)

If, in step 1409, $M'_{LO}$ is greater than $M'_{HI}$, the provisional slope range is empty, and the new endpoint must be computed from the prior vertex point. Accordingly, in step 1411, the process returns to depth $z_j$ of the prior vertex. In step 1412, the new output segment is defined as the segment originating at vertex $(z'_i, V'_i)$, having a slope equal to ($M_{LO}+M_{HI}$)/2, and having a new endpoint at depth $z_j$. In step 1413, the new endpoint is designated as the origin of the next output segment. The process then returns to step 1400 to determine the next output segment.

Application of the above compression method to a sample function is illustrated in FIGS. 15A–15G. In FIG. 15A, visibility function 1500 is shown as a piecewise linear function having fourteen vertices at depths Z1 through Z14. An upper error bound 1501A is illustrated at a constant positive offset from function 1500. Similarly, a lower error bound 1501B is illustrated at a constant negative offset from function 1500.

To begin compression, the vertex at depth Z1 is set as the origin of an output segment to be determined. In FIG. 15B, maximum and minimum slope values ($M_{HI}$ and $M_{LO}$, respectively) are determined based on upper error bound 1502A and lower error bound 1502B of the vertex at depth Z2. At depth Z3, the minimum slope $M_{LO}$ is maintained because it is within the error bounds at that depth. However, the maximum slope must now be redefined using the upper error bound at depth Z3. In FIG. 15C, it is shown that the slope range has been restricted to the maximum slope determined by upper error bound 1503 of the vertex at depth Z3, and the minimum slope determined by lower error bound 1502B. Considering the upper and lower error bounds of the vertex at depth Z4 yields an empty set with respect to the new slope range. Thus, the endpoint of the current output segment is determined at depth Z3 using the centerpoint of the slope range from FIG. 15C.

Figure 15D:
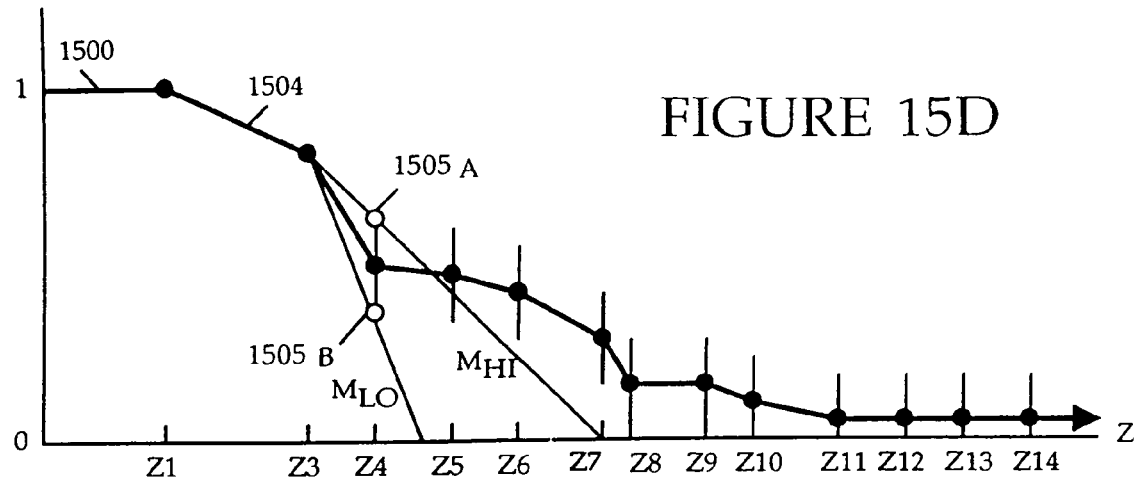
Figure 15E:
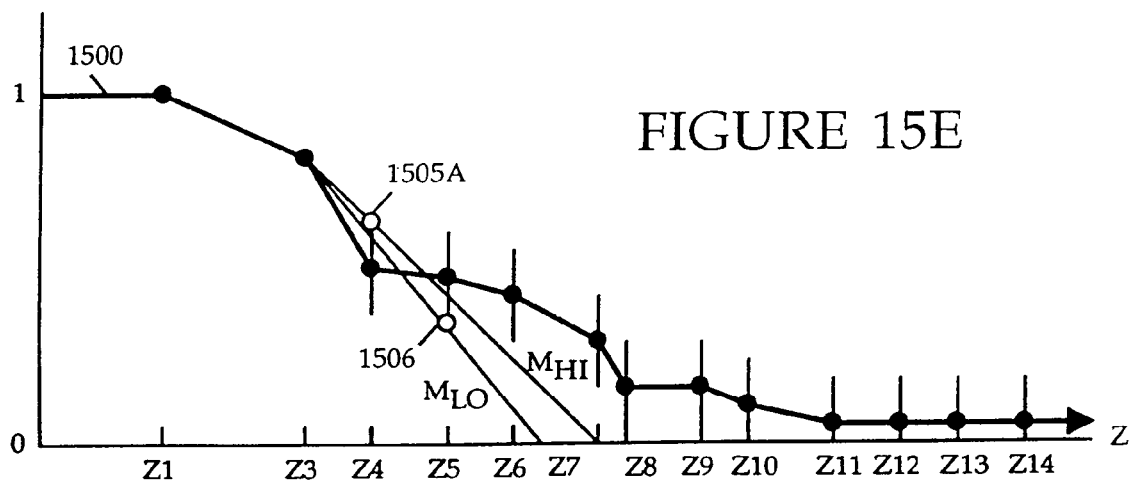

FIG. 15D shows the new output segment 1504, having endpoints at depths Z1 and Z3. The endpoint at depth Z3 now becomes the origin of the next output segment. Thus, a new slope range is determined from upper error bound 1505A and lower error bound 1505B of the vertex at depth Z4. As illustrated in FIG. 15E, a nonzero slope range can be determined using the upper error bound 1505A of the vertex at depth Z4 and lower error bound 1506 of the vertex at depth Z5. The error bounds of the vertex at depth Z6 do not fall within the slope range. Thus, the new segment endpoint is calculated at depth Z5, using the midpoint of the slope range. The new output segment 1507 is shown in FIG. 15F.

Figure 15F:
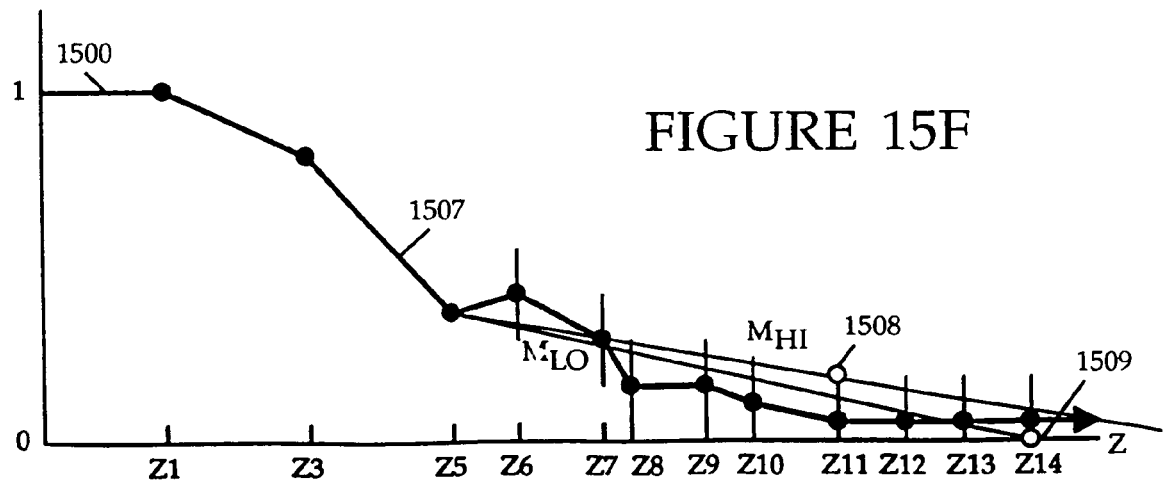
Figure 15G:
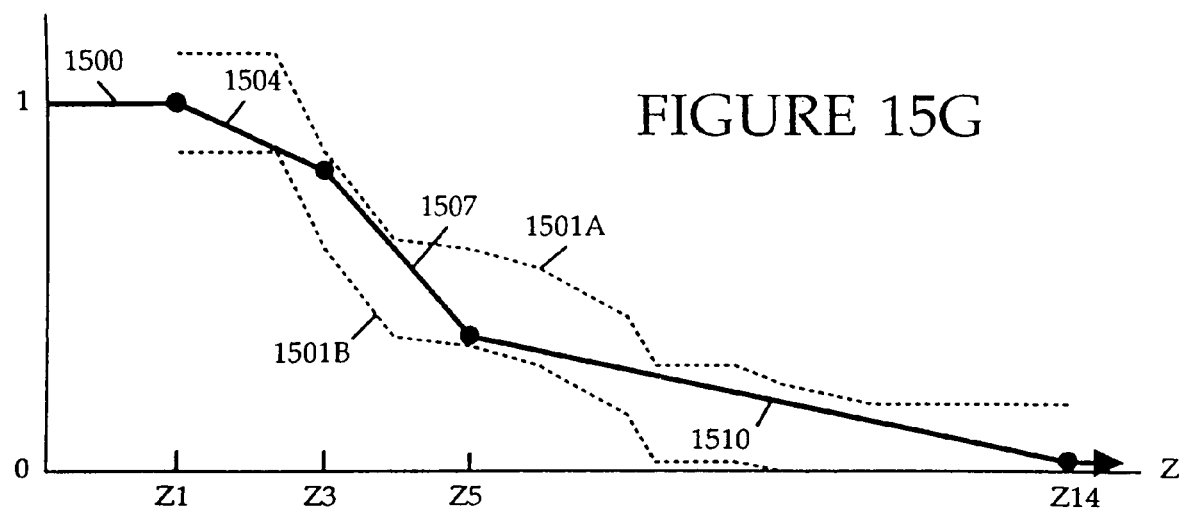

In FIG. 15F, by applying the slope range determination steps from the new output vertex at depth Z5, a maximum slope is determined from the upper error bound 1508 of the vertex at depth Z11, whereas the minimum slope is determined from the lower error bound 1509 of the final vertex at depth Z14. The last output vertex is thus calculated at depth Z14. The new output segment 1510 is shown in FIG. 15G. Also, error bounds 1501A and 1501B are shown to illustrate that the new piecewise linear output function defined by the four new vertices at depths Z1, Z3, Z5 and Z14, satisfies the error constraints placed on the compression method.

The compression method described above is fast, simple to implement, and utilizes constant storage. Approximations can be slightly improved by doing a least-square fit once the z values of the output vertices have been fixed. However, the computed vertices satisfy the given error criteria and generate very good approximations in practice.

Performing Lookups During Rendering

The foregoing description refers to methods and apparatus for generating deep shadow maps as part of a pre-rendering operation. The following description provides methods for utilizing the pre-rendered deep shadow maps during a pixel rendering process.

Figure 16:
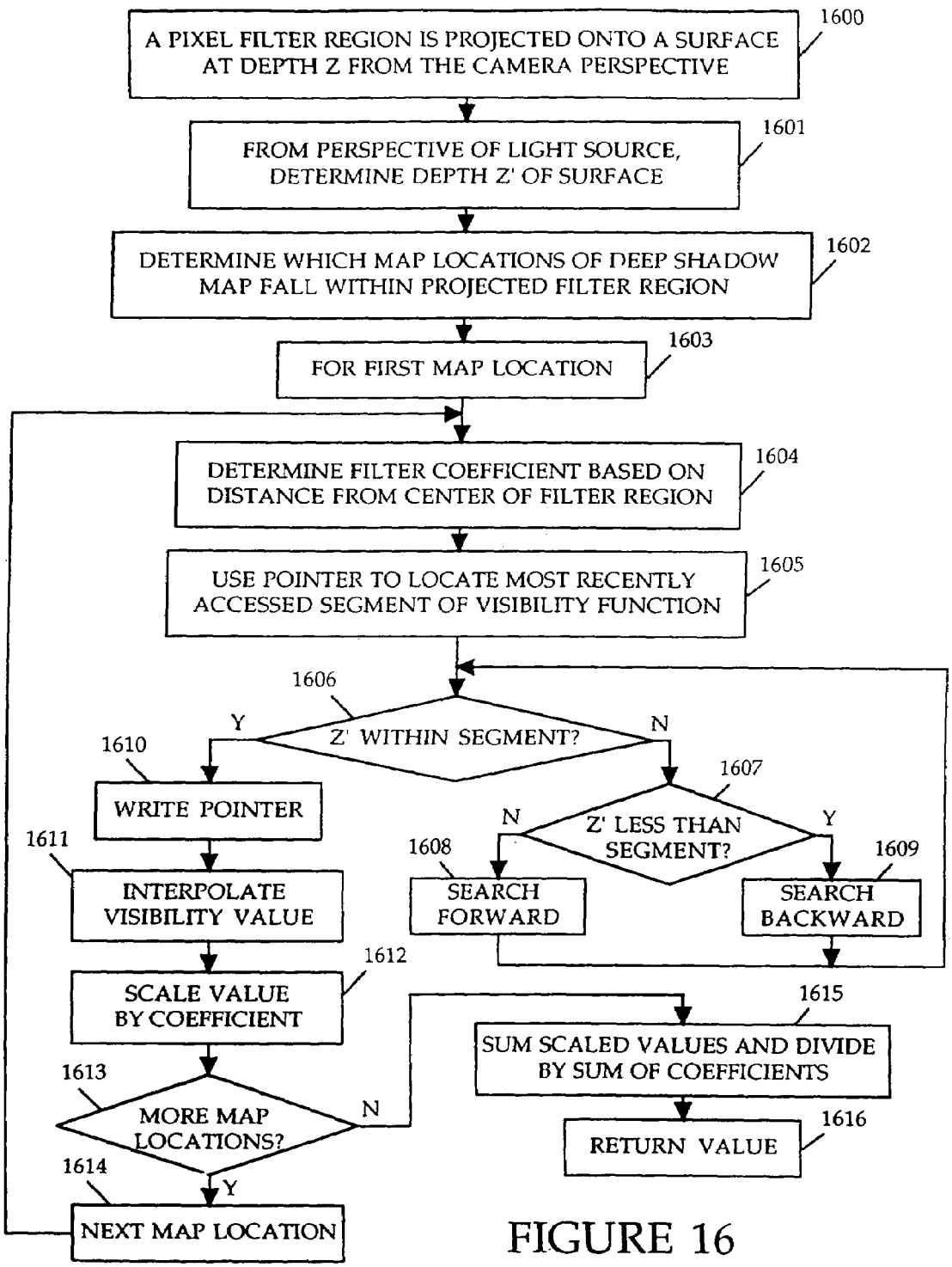
FIG. 16 is a flow diagram of a method for implementing deep shadow map lookups in accordance with an embodiment of the invention.

Deep shadow map lookups are handled by applying a reconstruction and resampling filter to the visibility function values at a constant depth. FIG. 16 provides a flow diagram of a method for performing deep shadow map lookups in accordance with one or more embodiments of the invention.

In step 1600, a pixel filter region is projected onto a surface at depth z as seen from the camera perspective. Surface samples within the filter region will be used to determine the pixel value associated with that filter region. As part of the rendering process, the lighting characteristics of the surface (in the form of a filtered visibility value) are obtained via deep shadow map lookup as described in steps 1601 to 1616.

In step 1601, the depth z' of the surface (within the projected filter region) is determined from the perspective of the light source, and, in step 1602, those deep shadow map locations that fall within the projected filter region are identified. This may be accomplished, for example, by associating a bounding box with the projected filter region, and filtering those map locations that fall within the bounding box.

In step 1603, a first map location is selected to be processed, and, in step 1604, a filter coefficient is determined for the current map location. For example, the filter coefficient could be based upon the distance of the map location from the center of the projected filter region (or bounding box) in the map plane. In step 1605, a pointer associated with the map location is used to identify the last segment (or vertex) accessed in a prior lookup operation. Some embodiments may omit the use of this pointer, in which case, any vertex in the stored visibility function may be used as a starting point. However, since many shadow lookups are performed at nearby z values, use of such a pointer can reduce the average cost of visibility function evaluations by directing the start of a depth search to the region of the visibility function most likely to contain the target depth.

In step 1606, the lookup process determines whether the current segment of the visibility function contains a value for the target depth z' (e.g., by comparing the target depth with the vertices forming the endpoints of the current segment. If the current segment does not contain the depth value z', a linear search (other search methods could also be used) is performed on the sequence of visibility vertices, as shown by steps 1607–1609. In step 1607, if the target depth z' is less than the depths included in the current segment, the sequence of vertices is traversed backward (i.e., toward z=0) in step 1609, and the process returns to step 1606 to see if the new segment contains the target depth value. However, if, in step 1607, the target depth is greater than the depth of the current segment, then, in step 1608, the sequence of vertices is traversed in the forward direction (i.e., toward z=∞). From step 1608, the process returns to step 1606.

If, at step 1606, the target depth z' does reside within the current segment, the associated pointer is updated to point to the current segment in step 1610. In step 1611, the visibility value is interpolated from the current segment using the depth value z', and, in step 1612, the interpolated value is scaled by the corresponding weighted coefficient. In step 1613, if there are further map locations to process within the projected filter region, the lookup process turns its focus to the next map location in step 1614, and the lookup process returns to step 1604.

If, in step 1613, there are no further map locations to process, the scaled values derived in step 1612 are summed together in step 1615, and the result divided by the sum of the coefficients. In step 1616, the lookup process returns the computed value from step 1615 as the resampled visibility value. The pixel rendering process can then consider the fractional visibility value in determining the given light source's contribution to the shading of the surface.

Storage of Deep Shadow Maps

The following is a description of data representations and storage formats that may be used to implement deep shadow maps in accordance with one or more embodiments of the invention. It will be apparent to one skilled in the art that, in various embodiments, the deep shadow maps described herein may be implemented with a variety of data structures and file formats without departing from the scope of the invention.

Multi-Channel Maps and Colored Shadows

In the foregoing description, deep shadow maps are described in terms of vertices having a depth value and a function value. The concepts described, however, may be extended to encompass any number of functions by implementing the deep shadow maps with multiple channels. This is accomplished by associating multiple function values with each depth such that the pair (z, V) becomes the multi-channel tuple (z, $V_1$, $V_2$, . . . , $V_N$). The multi-channel representation may be used to describe multiple functions for the same sample point, such as color-based visibility functions for the same sample ray, or it may be used to describe a single function (or multiple functions) for multiple sample points, such as a monochrome transmittance or visibility function for each sample point or map location in a 2×2 neighborhood (also referred to as a "quad"). Note that these techniques are not possible with shadow maps of the prior art.

Color-based visibility functions are useful for determining colored shadows, i.e., shadows cast by surfaces which have color-dependent transmittances. For example, a colored surface might be opaque to certain colors while being substantially transparent to other colors. This multi-channel representation allows for this color-dependent visibility behavior to be efficiently modeled.

Quad processing can be advantageous from a concurrent memory access standpoint. Four neighboring functions may be accessed at the same map location, and depth searching for multiple neighboring samples at the same depth can be accomplished with a single search. Further bilinear interpolation techniques (or trilinear interpolation where mip-mapping techniques are used) may be efficiently implemented using quad visibility functions.

The common point between functions represented in a multi-channel map is that the vertices for all of the functions occur at the same depth values. The compression process operates on all the channels simultaneously, and starts a new segment for each function whenever any of the functions would exceed its error threshold. An advantage to this approach is that some amount of additional data compression is achieved. For example, a deep shadow map with three channels is only twice as large as a single-channel map, yet contains three times the number of functions. In practice, the number of vertices needed to represent the functions may increase due to the added constraint upon the compression process, in that the compression process must maintain error bounds on all of the associated functions simultaneously.

Figure 17:
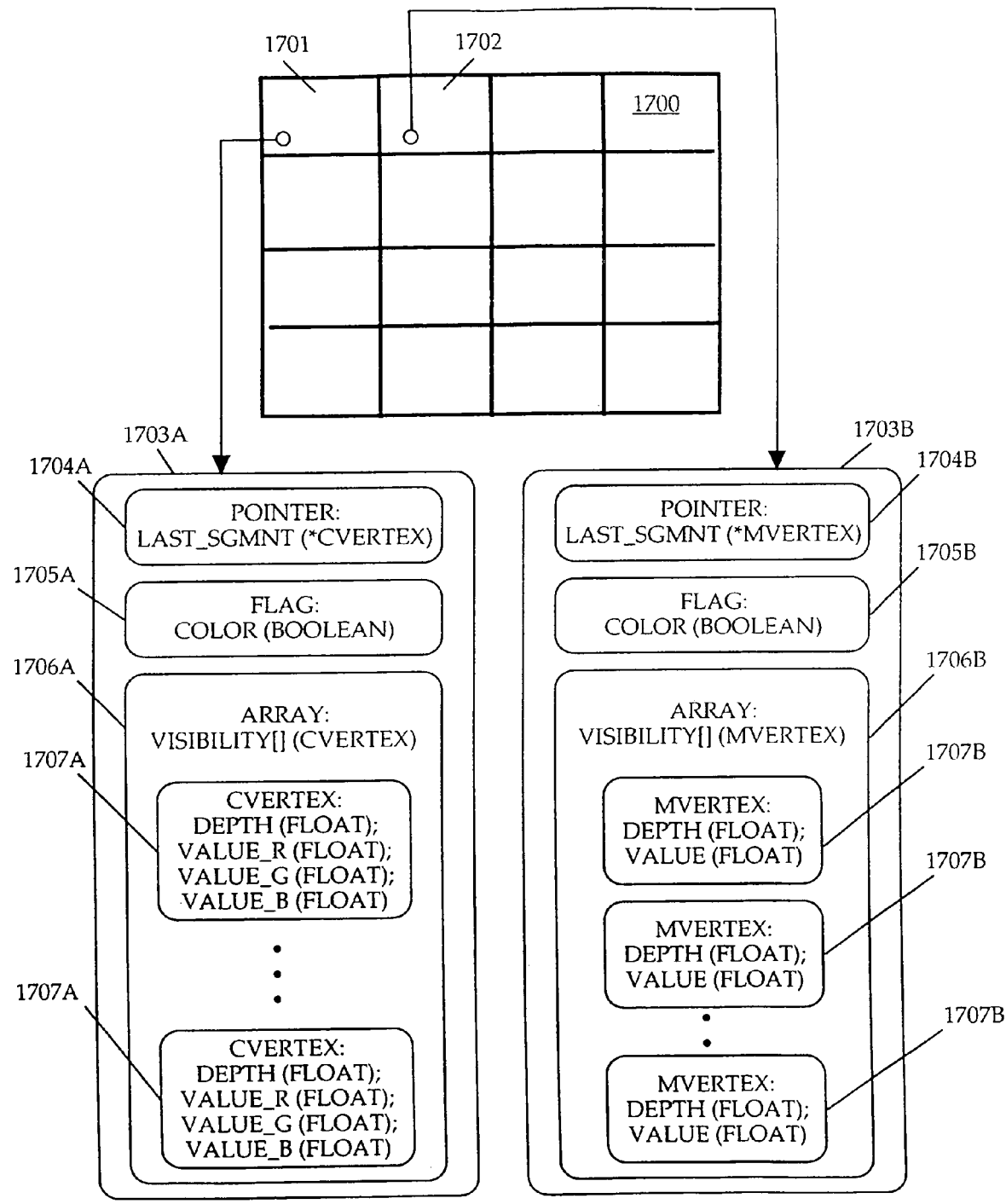
FIG. 17 is a diagram of a shadow map implementation for monochrome and color shadows in accordance with an embodiment of the invention.

As an example application of multi-channel maps, FIG. 17 illustrates an implementation of monochrome and color visibility functions within a single deep shadow map, in accordance with one or more embodiments of the invention. FIG. 17 contains a deep shadow map 1700 comprising an array of map locations such as map locations 1701 and 1702. As shown, map location 1701 has an associated multi-channel function representation 1703A, whereas map location 1702 has an associated single-channel function representation 1703B.

Multi-channel representation 1703A comprises an array or list of function vertices 1706A, containing one or more color vertex elements 1707A. Each color vertex element (CVERTEX) 1707A contains a depth value (DEPTH), a red visibility value (VALUE_R), a green visibility value (VALUE_G) and a blue visibility value (VALUE_B). DEPTH, VALUE_R, VALUE_G and VALUE_B are shown as floating point data types, though other data types may be used in other embodiments.

Also associated with multi-channel representation 1703A, in this embodiment, are pointer 1704A and flag 1705A. (Note that pointer 1704A and flag 1705A need not reside within the same data structure as vertex elements 1707A.) Pointer 1704A (LAST_SGMNT) is a pointer to a color vertex element (CVERTEX) 1707A, specifically, the color vertex element last accessed in a depth search of map location 1701. As stated previously with respect to FIG. 16, pointer 1704A is used in some embodiments to reduce the average cost of depth searches by providing a more likely initial starting point for the search.

Flag 1705A (COLOR) is used to specify whether the associated representation (1703A) is a color representation (i.e., multi-channel) or a monochrome representation (single channel). A simple Boolean value may be used as the flag, in which case a "TRUE" value might indicate representation 1703A is a color or multi-channel representation. Other types of flags might also be used, such as an integer whose value indicates the type of representation or the number of channels in the representation. This flag enables a single deep shadow map to use multiple representation types (e.g., three-channel and single-channel), and to differentiate between them.

Single-channel (or monochrome) representation 1703B comprises an array or list of function vertices 1706B, containing one or more monochrome vertex elements 1707B. Each monochrome vertex element (MVERTEX) 1707B contains a depth value (DEPTH) and a visibility value (VALUE). As with vertex elements 1707A, DEPTH and VALUE are shown as floating point data types, though other data types may also be used.

As with representation 1703A, associated with multi-channel representation 1703B are pointer 1704B and flag 1705B. Pointer 1704B (LAST_SGMNT) is a pointer to a monochrome vertex element (MVERTEX) 1707B, specifically, the monochrome vertex element last accessed in a depth search of map location 1702.

As with flag 1705A, flag 1705B (COLOR) is used to specify whether the associated representation (1703B) is a color representation (i.e., multi-channel) or a monochrome representation (single channel). In this case a "FALSE" value might indicate representation 1703B is a monochrome or single-channel representation.

Mip-Mapping with Deep Shadow Maps

Mip-mapping is an imaging technique commonly applied to texture data. With this technique, the same texture is stored at multiple resolutions to accommodate different pixel resolutions within a rendered image (e.g., near surfaces have a higher pixel resolution than surfaces further away from the camera location). When the texture is mapped to a surface, the texture map level is used that has the minimum resolution necessary to match the pixel resolution of the surface. This reduces the amount of filtering that must take place during the mapping operation to bring the base level texture samples to the resolution of the surface pixels.

Shadow maps of the prior art do not permit mip-mapping because depth values cannot be filtered without introducing significant shadowing error. Prior art shadow maps are thus limited to single high-resolution maps, if visual quality is to be maintained. Unlike the prior art, deep shadow maps comprise filtered functions from which lower resolution maps may be obtained without significant degradation in output quality. Thus, in one or more embodiments of the invention, mip-mapping is employed to improve rendering efficiency. Multi-level or mip-mapped deep shadow maps can be filtered in like manner to mip-mapped textures, including application of anisotropic filters, lerping (i.e., linearly interpolating) between levels, etc.

Figure 18A:
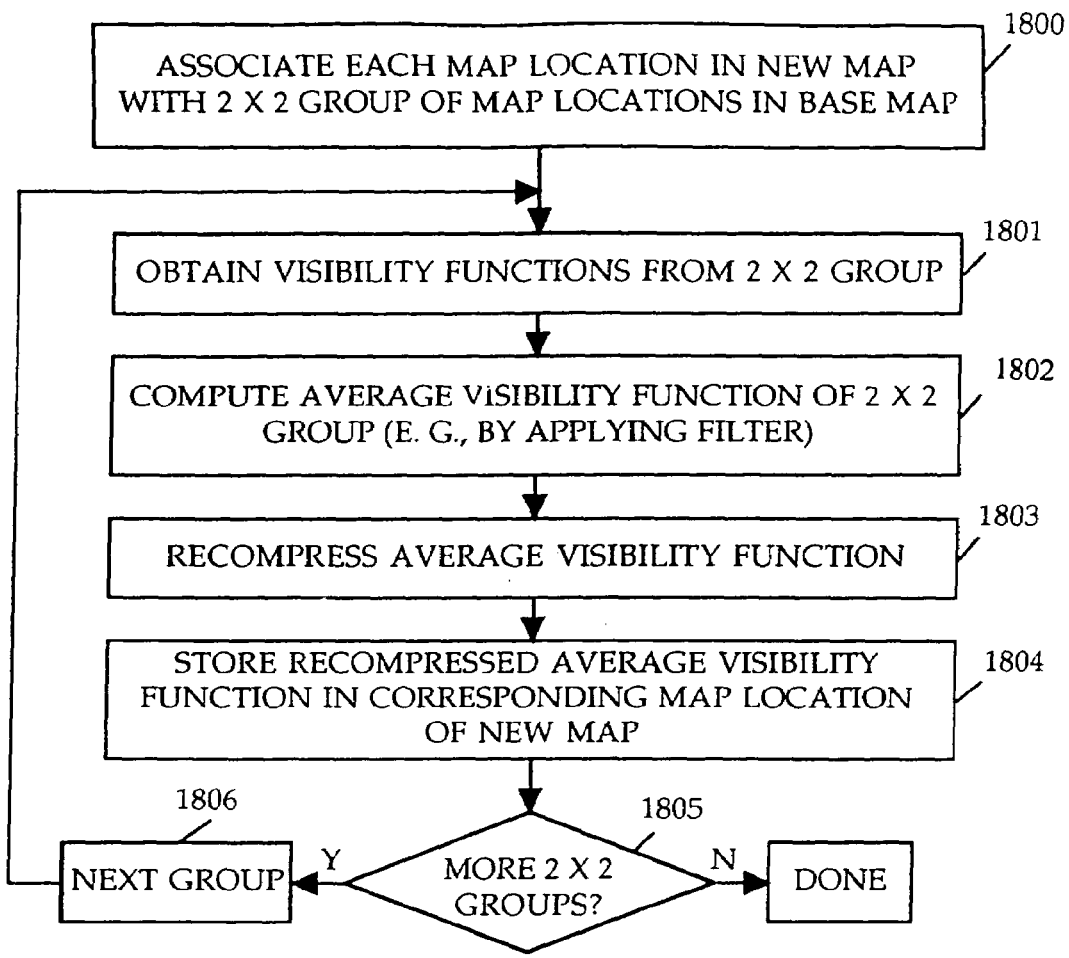
FIG. 18A is a flow diagram of a method for generating multiple levels of deep shadow maps in accordance with an embodiment of the invention.

FIG. 18A is a flow diagram illustrating a method for generating multi-level deep shadow maps in accordance with one or more embodiments of the invention. Given a base map at a base resolution, the following method generates a new map level that is reduced in resolution by a factor of two in x and y. The method of FIG. 18A may be applied recursively to build a set of map levels with successively lower resolution.

In step 1800, given a base map, each map location in the new map is associated with a 2×2 group of map locations in the base map. In step 1801, the four visibility functions corresponding to a 2×2 group of base map locations are accessed for downsampling in x and y. The average visibility function is computed from the four base visibility functions in step 1802, for example, by applying the filtering process of FIGS. 13B–13C using equally weighted coefficients. In step 1803, the average visibility function is recompressed, e.g., per the method described with respect to FIG. 14, and, in step 1804, the recompressed visibility function is stored in the corresponding map location of the new map level. If, in step 1805, there are more 2×2 groups of base map locations to consider, the next group is obtained in step 1806, and the method returns to step 1801; otherwise, the new map level is complete.

Figure 19:
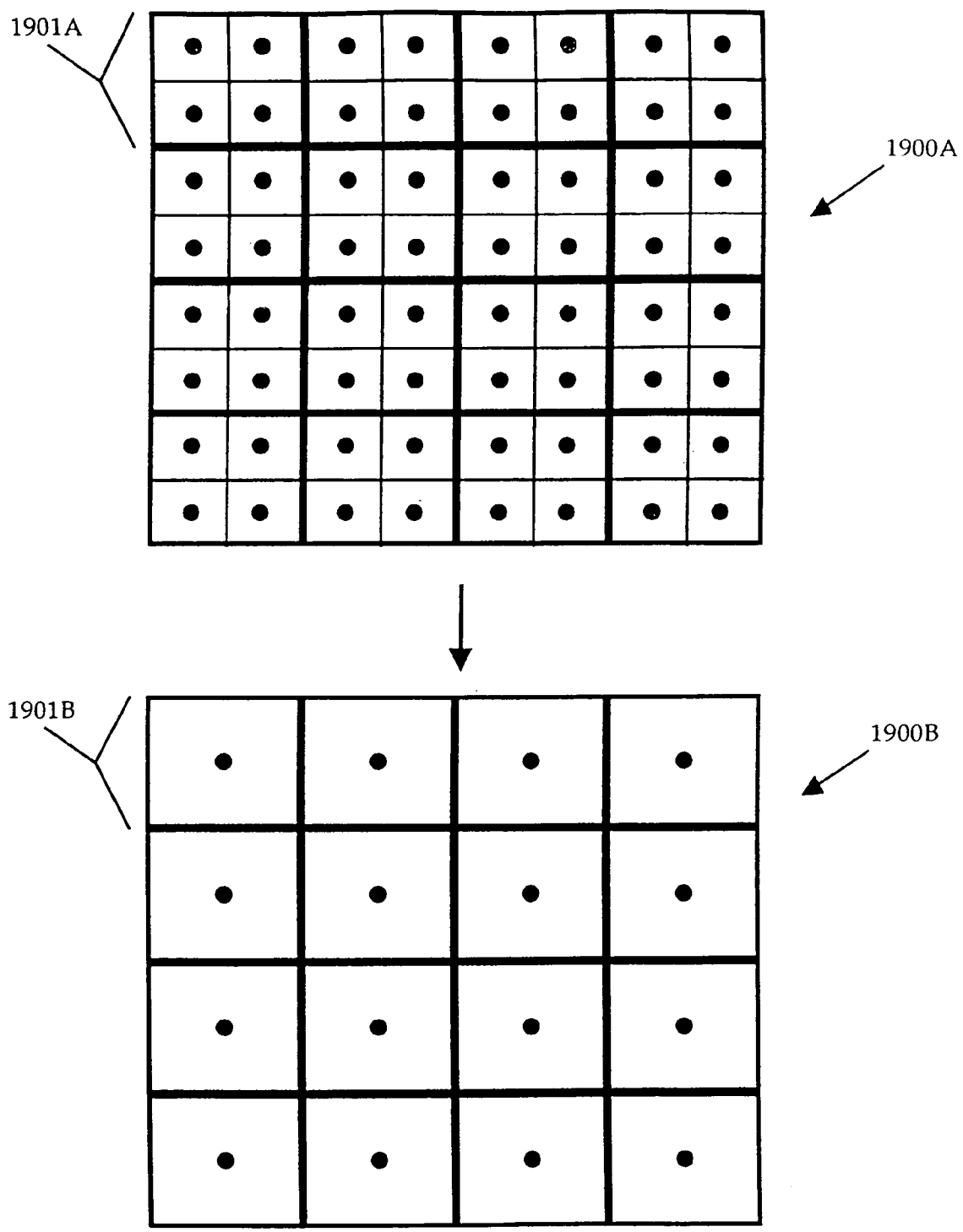
FIG. 19 is a diagram of a mip-mapping implementation of deep shadow maps in accordance with an embodiment of the invention.

The effects of the map generation process of FIG. 18A are illustrated in FIG. 19. FIG. 19 shows a base map level 1900A that has been divided into 2×2 groups of map locations, such as group 1901A. The four component visibility functions of group 1901A are averaged and recompressed to form a single visibility function located at the center of map location 1901B in new map level 1900B. Because the new visibility function is ultimately based on samples filtered from the highest resolution map, benefits of the original high resolution sampling are still maintained.

To avoid an accumulation of error, the compression tolerance can be reduced on each successive map level. For example, if the error threshold is cut in half each time the averaged functions for a new map level are recompressed, the total error will be at most twice that permitted for the highest-resolution map. Due to the reduced compression tolerance, the number of vertices per visibility function can be expected to double once for every two mip-map levels approximately. The full map set comprising all map levels is approximately $1/(1-\sqrt{2}/4) \approx 1.55$ times as large as the base level (rather than the usual 4/3 ratio for an ordinary texture mip-map).

Alternately, each level can be computed from the highest level, in which case the error does not have to increase from level to level. This results in a smaller map, but costs more to generate.

Figure 18B:
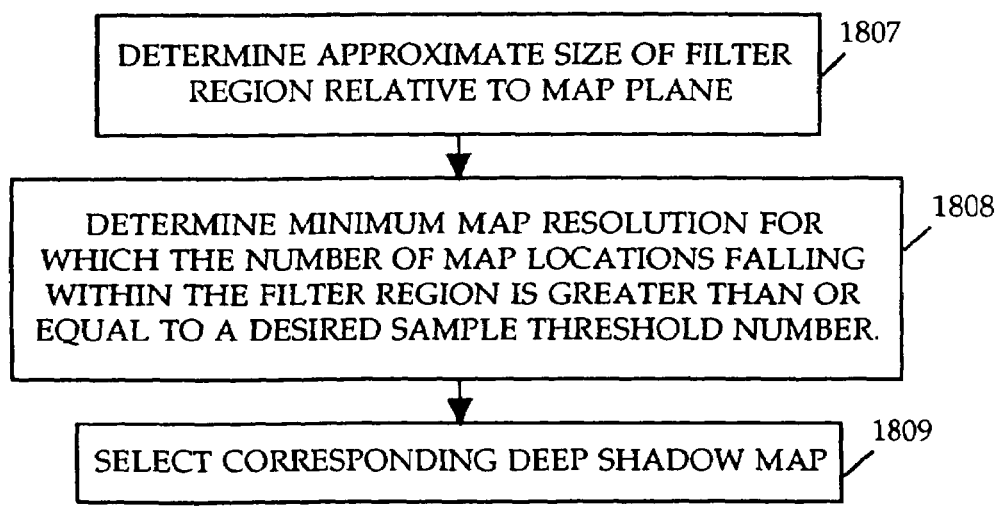
FIG. 18B is a flow diagram of a method for selecting a map level during a lookup in accordance with an embodiment of the invention.

To utilize the multiple map levels during rendering, the lookup method previously described with reference to FIG. 16 may be modified slightly to implement map level selection. For example, in one embodiment, steps 1807–1809 of FIG. 18B are performed between step 1601 and 1602 of FIG. 16.

In step 1807, the approximate size of the pixel filter region relative to the map plane is determined. This can be done, for example, by determining the maximum and minimum x and y values of the pixel filter region projected back onto the map plane. A bounding box can then be generated to approximate the filter region.

In step 1808, the minimum map resolution is determined for which the number of map locations falling within the approximated filter region is greater than (or equal to) a specified sample threshold number. The map resolution may be represented as a "level of detail" determined by the distance in absolute x and y values between successive map locations. The sample threshold number represents a tradeoff between computational rendering complexity (more samples increases resource usage and processing time) and rendering quality (more samples increases output quality). In step 1809, based on the minimum map resolution determined in the previous step, the corresponding map level is selected for use in the lookup operation (as continued in step 1602 of FIG. 16).

The mip-mapping methods described above permit deep shadow maps to take full advantage of prefiltering during the pre-rendering process to minimize the number of memory accesses needed during the pixel rendering process (subject to the sample threshold number). Thus, the rendering process can be performed more quickly with high resolution shadow rendering quality.

File Format for Deep Shadow Maps

Rendering is a memory intensive process. Therefore, to maximize memory efficiency, some embodiments of the invention store deep shadow maps in secondary memory, such as on a disk drive, and maintain only a subset of the map data in primary memory (e.g., application memory or RAM). This ensures that sufficient memory resources are available for other aspects of the rendering process.

Figure 20:
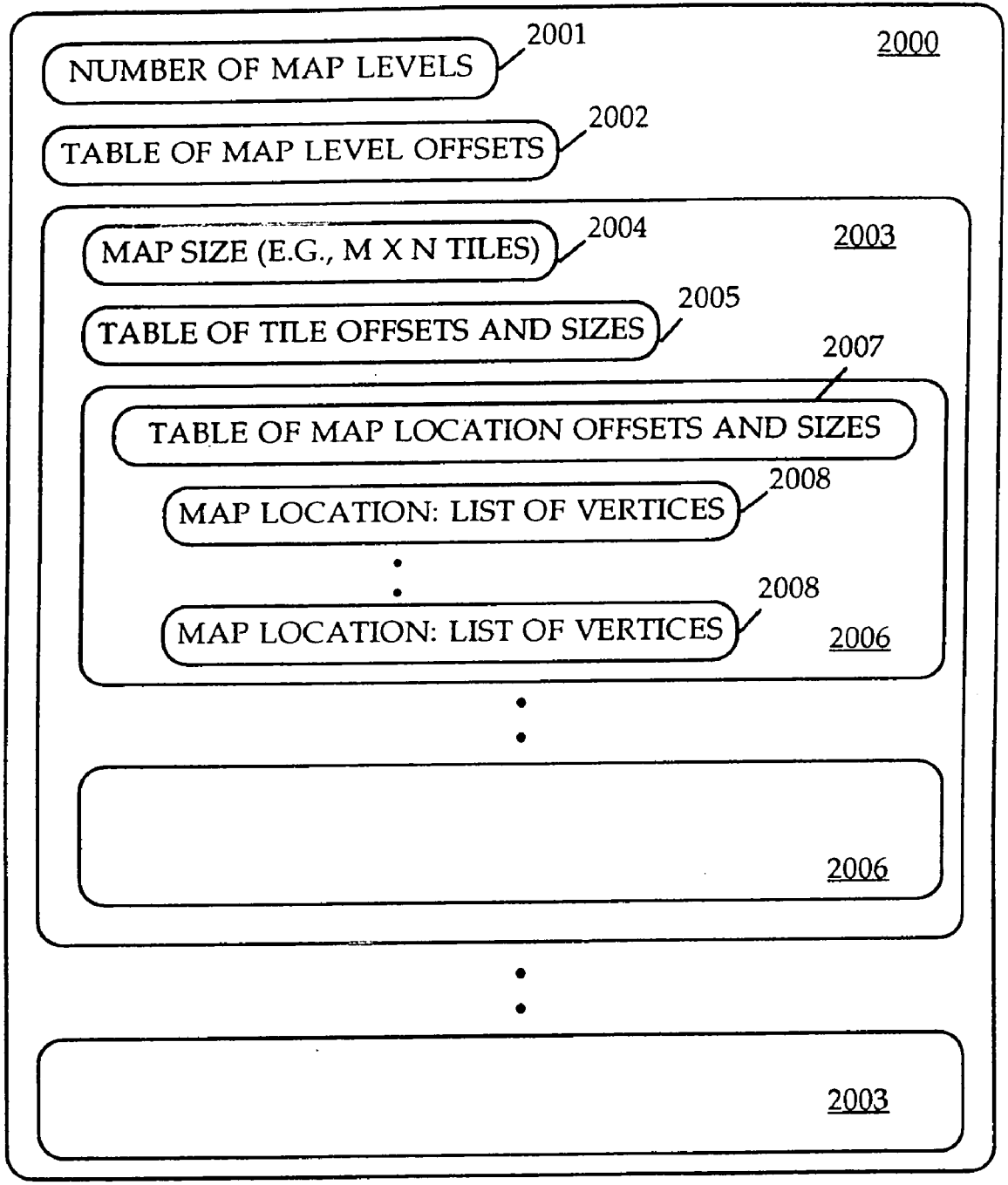
FIG. 20 is a diagram of a file format for deep shadow maps in accordance with an embodiment of the invention.

An example of a possible file format for storing deep shadow maps is illustrated in FIG. 20. All of the component elements of the file format described herein may be stored in secondary memory as a single contiguous data file, for example. It will be apparent to those skilled in the art that other file formats may also be employed without departing from the scope of the invention.

In FIG. 20, a file 2000 comprises an integer value 2001 representing the number of map levels included in the file, one or more map levels 2003, and a table of integer offsets identifying the starting location for each of the map levels 2003.

Each map level 2003 comprises a map size value 2004, a table 2005 of integer tile offsets and sizes, and one or more tiles 2006. Map size value 2004 identifies the dimensions of the map level in terms of tiles (e.g., 22×16 tiles). Table 2005 lists the starting offsets, as well as the tile size (e.g., in bytes), for each of the tiles 2006 within the given map level. A tile, in this instance, is a subset of contiguous map locations within a given map. Typically, the tile is two-dimensional (in x and y) in its configuration.

Each tile 2006 comprises a table 2007 of integer map location offsets and sizes, as well as one or more map locations 2008. Table 2007 lists the starting offsets, as well as the map location size (e.g., in vertices or vertex tuples) for each of the map locations in the tile. As described previously, each map location is a list of vertices, wherein each vertex comprises a depth value and one or more function values. The file format may be traversed to obtain desired deep shadow map data by reading the appropriate integer offset values at each level to navigate to the address of the target data.

Tiling and Caching

In one or more embodiments, a data cache is implemented within primary memory to store tiles of shadow map data during processing. Only those tiles currently or recently accessed are maintained in the cache, minimizing the shadow map footprint within the primary memory.

Figure 21:
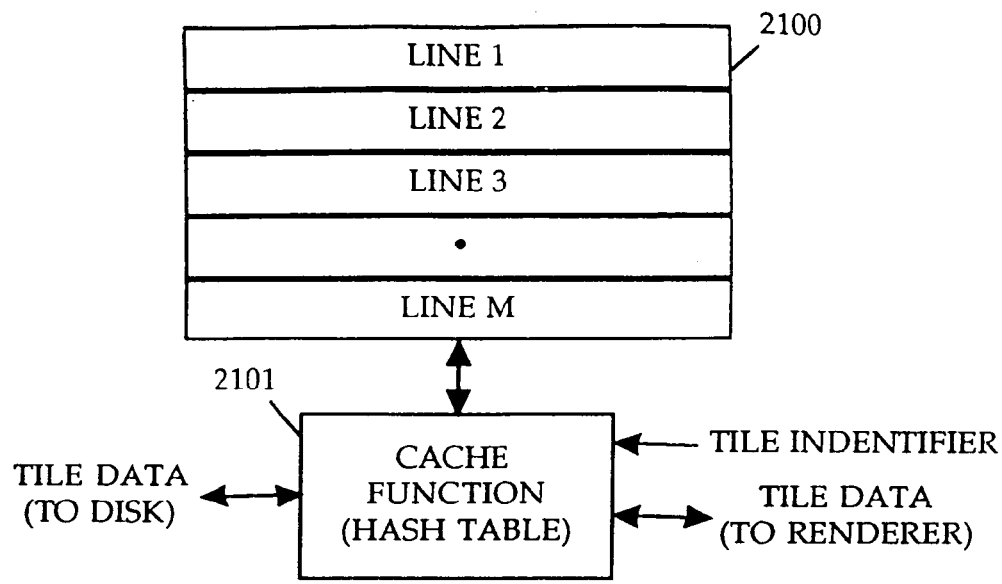
FIG. 21 is a block diagram of a cache implementation in accordance with an embodiment of the invention.

A block diagram of a cache implementation is provided in FIG. 21. As shown, a portion of primary memory is allocated as multiple cache lines 2100. Each cache line is configured to contain a tile of data from a deep shadow map. Cache function 2101 is associated with cache lines 2100 to manage access to the data within the cache lines, as requested by a rendering application, and to implement a cache line replacement policy between cache lines 2100 and the tile data stored in secondary memory (e.g., in a file on a disk or other permanent storage).

Cache function 2101 contains a hash table which takes as input a unique tile identifier (e.g., a map ID, map level number and tile number) supplied by the rendering application and determines whether the corresponding file is in one of cache lines 2100. In the event of a cache "hit" (i.e., the requested tile is in one of cache lines 2100), the corresponding tile data is made available to the rendering application. In the event of a cache "miss" (i.e., the tile is not present in one of cache lines 2100), one of the resident tiles is evicted from cache lines 2100 in accordance with the particular cache line replacement policy. The requested tile data is then read into the vacated cache line from secondary memory in what is referred to as a cache line "fill."

One aspect of deep shadow maps that the cache implementation must consider is that deep shadow map tiles require varying amounts of storage. This is because varying numbers (and sizes) of vertices may be used to represent visibility functions within map locations. This size issue may be handled by determining a maximum tile size based on a maximum permitted number of vertices in each map location, in which case the compression process may be configured to enforce the new constraint. The cache lines may then be set to accommodate the maximum tile size.

Another mechanism for handling the tile sizing issue is to implement dynamic cache line sizing within the cache implementation. The cache is then free to grow to meet the needs of the data being cached. Because the cache size is flexible and does not need to meet the requirements of a worst-case tile size scenario at all times, more efficient memory usage can be achieved.

Figure 22:
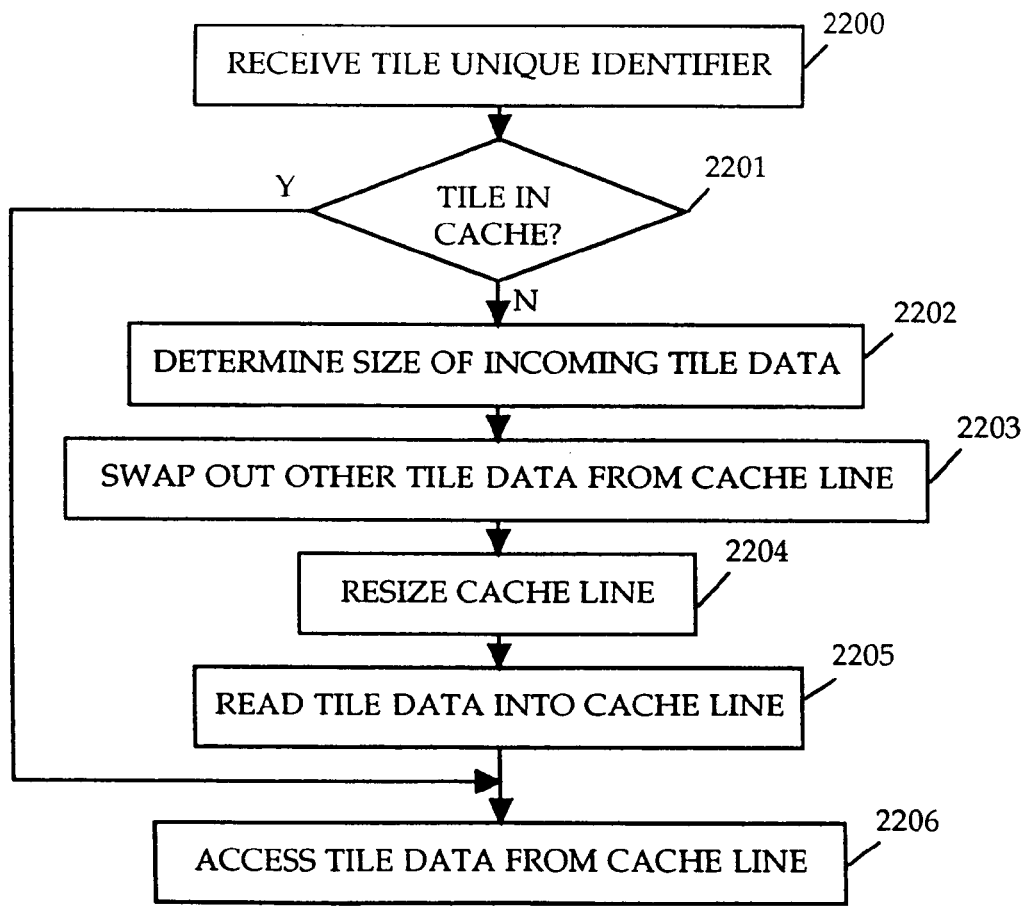
FIG. 22 is a flow diagram of a caching method with cache line resizing in accordance with an embodiment of the invention.

FIG. 22 illustrates one embodiment of a caching method that implements dynamic cache line resizing in accordance with one or more embodiments of the invention. In step 2200, the cache function 2101 receives a unique identifier for a tile of data. As stated above, this identifier may comprise, for example, a map ID, map level number and tile number. In step 2201, if cache function 2101 determines that the requested tile data is in one of the cache lines, the requested tile data is output in step 2206 to the requesting application (e.g., the renderer). Though not shown, more specific address information, such as a map location identifier and vertex number), may be used to access a particular map location or vertex tuple.

If, in step 2201, cache function 2101 determines that the requested tile data is not resident in one of the cache lines (e.g., by querying the hash table), then, the method continues in step 2202, where the size of the requested tile is determined (e.g., from table 2005 of the map data file). One of the resident tiles is evicted from a specified cache line in step 2203, and, in step 2204, the specified cache line is resized according to the size data determined in step 2202. In step 2205, the requested tile is read into the resized cache line from secondary memory, and, in step 2206, the rendering application accesses the tile data from the cache.

Note, it is sufficient for the cache line to be resized when the current cache line size is smaller than the tile size. However, it is not necessary for the cache line to be resized if the current size of the cache line is bigger than the tile size. In one embodiment, the cache line is resized for each new tile. In another embodiment, the cache line is resized only when the tile size is larger than the current cache line size. In other embodiments, a cache line is always resized to accommodate a larger tile size, but is resized to a smaller tile size only if the tile size is significantly smaller or if the cache line has been consistently smaller over a period of time or a number of prior cache line fills.

Motion Blur

A desired imaging effect in animation is motion blur. When shadows are not motion blurred, strobing and other unwanted artifacts can occur. Unlike prior art shadow maps, deep shadow maps allow motion blur to be added without incurring an extra filtering cost. With deep shadow maps, motion blur can be implemented by associating a random time with every sample point in the map plane (and its corresponding transmittance function). When the samples are filtered together into visibility functions, the samples account for the average coverage over time as well as over the image plane.

Associating a random time with every depth value in a shadow map of the prior art is very expensive, because large filter widths are needed for adequate anti-aliasing and all filtering must wait until the depth samples are converted at pixel rendering time. In contrast, deep shadow maps do much of this filtering in advance, and thus reduce the number of pixels that need to be accessed for each lookup at pixel rendering time.

Figure 23:
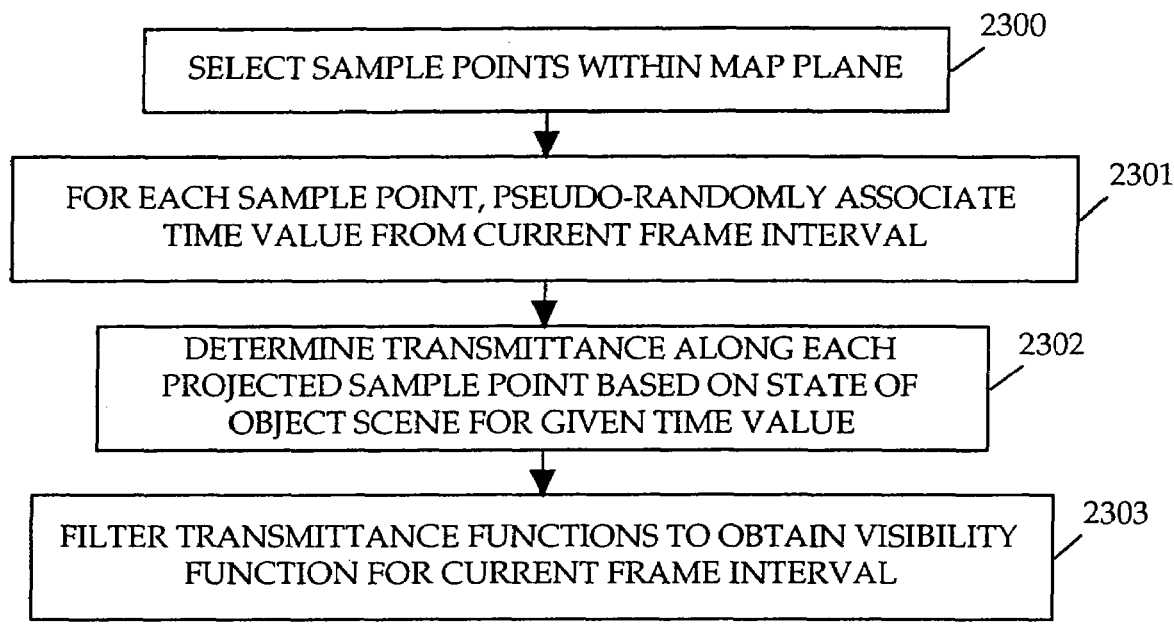
FIG. 23 is a flow diagram of a method for implementing motion blur of shadows in accordance with an embodiment of the invention.

FIG. 23 is a flow diagram of a sampling method for accomplishing motion blur of shadows in accordance with one or more embodiments of the invention. In step 2300, the map plane is diced into sample regions and sample points are selected from within those regions. In step 2301, a pseudo-random time value from the current frame interval is associated with each sample point. In step 2301, the transmittance function along each projected sample point is determined based on the state of the object scene at the instant specified by the time value associated with the respective sample point. In step 2303, the transmittance functions are filtered to produce a visibility function averaged in space over the filter region and averaged in time over the current frame interval. Further filtering may be performed in the pre-rendering process to generate multiple map levels in accordance with the mip-mapping techniques described herein, with the result that the output image includes shadows that are motion blurred without the need for additional high resolution filtering at pixel rendering time.

Motion blurred shadows produced with one or more of the embodiment described above are more correct when the receiving object is stationary with respect to the shadow camera. In particular, moving objects cast incorrect shadows onto other moving objects (and onto themselves). The deep shadow map effectively blurs an object's shadow over the entire shutter interval, allowing one object to cast shadows onto other objects at different times.

Computer Execution Environment (Hardware)

An embodiment of the invention can be implemented as computer software in the form of computer readable code executed on a general-purpose computer. Also, one or more elements of the invention may be embodied in hardware configured for such a purpose, e.g., as one or more functions of a graphics hardware system.

Figure 24:
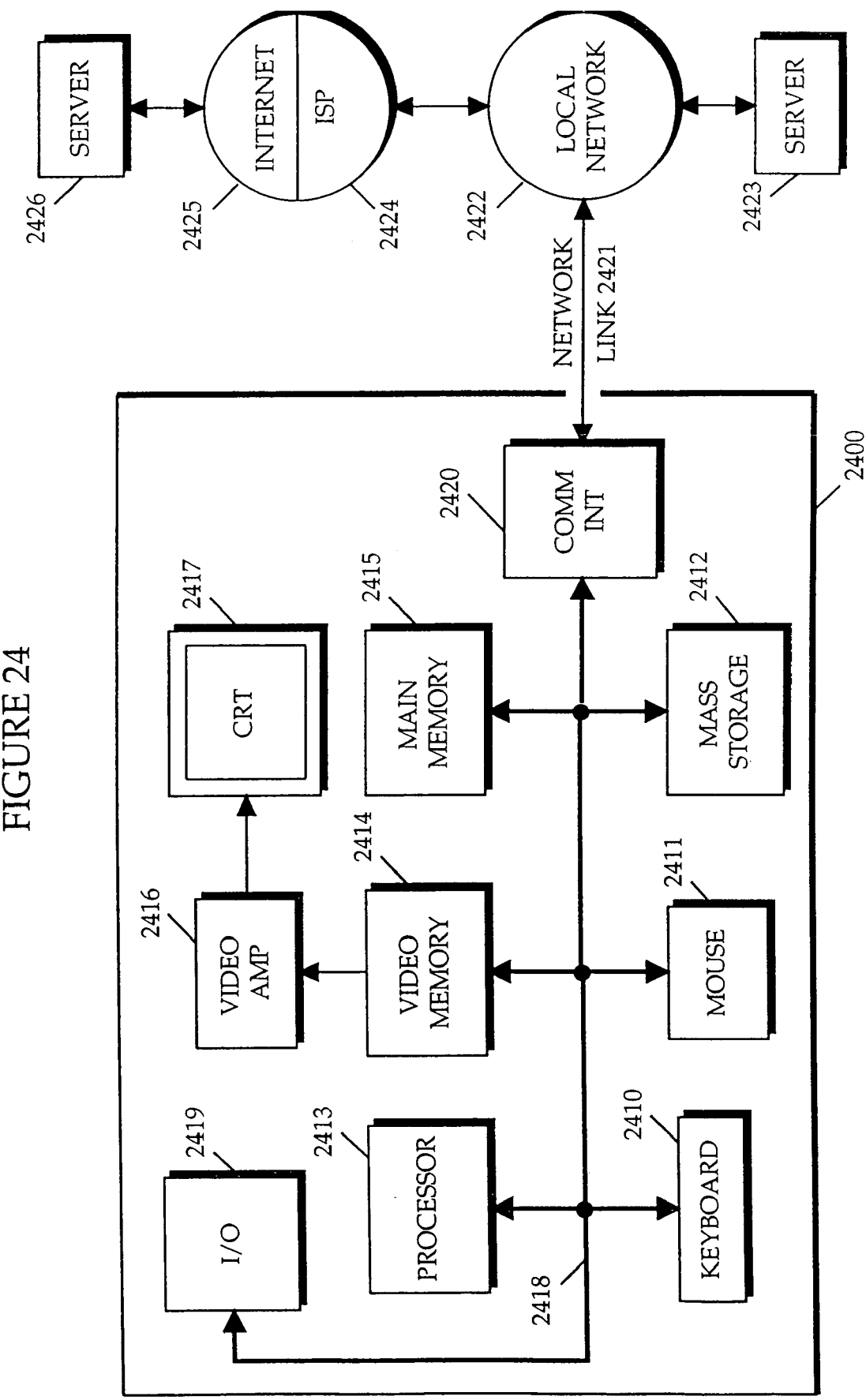
FIG. 24 is a general block diagram of one embodiment of a computer system in which embodiments of the present invention may be implemented.

An example of a general-purpose computer 2400 is illustrated in FIG. 24. A keyboard 2410 and mouse 2411 are coupled to a bi-directional system bus 2418. The keyboard and mouse are for introducing user input to the computer system and communicating that user input to processor 2413. Other suitable input devices may be used in addition to, or in place of, the mouse 2411 and keyboard 2410. I/O (input/output) unit 2419 coupled to bi-directional system bus 2418 represents such I/O elements as a printer, A/V, (audio/video) I/O, etc.

Computer 2400 includes video memory 2414, main memory 2415 and mass storage 2412, all coupled to bi-directional system bus 2418 along with keyboard 2410, mouse 2411 and processor 2413. The mass storage 2412 may include both fixed and removable media, such as magnetic, optical or magneto-optical storage systems or any other available mass storage technology. Bus 2418 may contain, for example, thirty-two address lines for addressing video memory 2414 or main memory 2415. The system bus 2418 also includes, for example, a 64-bit data bus for transferring data between and among the components, such as processor 2413, main memory 2415, video memory 2414 and mass storage 2412. Alternatively, multiplex data/address lines may be used instead of separate data and address lines.

In one embodiment of the invention, the processor 2413 is a microprocessor manufactured by Motorola, such as one of the PowerPC family of processors, or a microprocessor manufactured by Intel, such as the 80×86, or Pentium family of processors, or a SPARC™ microprocessor from Sun Microsystems™, Inc. However, any other suitable microprocessor or microcomputer may be utilized. Main memory 2415 is comprised of dynamic random access memory (DRAM). Video memory 2414 may be, for example, a dual-ported video random access memory. One port of the video memory 2414 is coupled to video amplifier 2416. The video amplifier 2416 is used to drive the cathode ray tube (CRT) raster monitor 2417. Video amplifier 2416 is well known in the art and may be implemented by any suitable apparatus. This circuitry converts pixel data stored in video memory 2414 to a raster signal suitable for use by monitor 2417. Monitor 2417 is a type of monitor suitable for displaying graphic images. Alternatively, the video memory could be used to drive a flat panel or liquid crystal display (LCD), or any other suitable data presentation device.

Computer 2400 may also include a communication interface 2420 coupled to bus 2418. Communication interface 2420 provides a two-way data communication coupling via a network link 2421 to a local network 2422. For example, if communication interface 2420 is an integrated services digital network (ISDN) card or a modem, communication interface 2420 provides a data communication connection to the corresponding type of telephone line, which comprises part of network link 2421. If communication interface 2420 is a local area network (LAN) card, communication interface 2420 provides a data communication connection via a network link 2421 to a compatible LAN. Communication interface 2420 could also be a cable modem or wireless interface. In any such implementation, communication interface 2420 sends and receives electrical, electromagnetic or optical signals which carry digital data streams representing various types of information.

Network link 2421 typically provides data communication through one or more networks to other data devices. For example, network link 2421 may provide a connection through local network 2422 to local server computer 2423 or to data equipment operated by an Internet Service Provider (ISP) 2424. ISP 2424 in turn provides data communication services through the world wide packet data communication network now commonly referred to as the "Internet" 2425. Local network 2422 and Internet 2425 both use electrical, electromagnetic or optical signals which carry digital data streams. The signals through the various networks and the signals on network link 2421 and through communication interface 2420, which carry the digital data to and from computer 2400, are exemplary forms of carrier waves transporting the information.

Computer 2400 can send messages and receive data, including program code or data, through the network(s), network link 2421, and communication interface 2420. In the Internet example, remote server computer 2426 might transmit a requested code for an application program through Internet 2425, ISP 2424, local network 2422 and communication interface 2420.

The received code may be executed by processor 2413 as it is received, and/or stored in mass storage 2412, or other non-volatile storage for later execution. In this manner, computer 2400 may obtain application code (or data) in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for rendering shadows have been described in conjunction with one or more specific embodiments. The invention is defined by the claims and their full scope of equivalents.

What is claimed is:

1. A method for determining a visibility function, wherein the visibility function is used to determine a light contribution from a light source associated with geometric elements, the method comprising:
   projecting a plurality of light rays through an object scene;
   determining a plurality of transmittance functions of depth by evaluating properties of the geometric elements encountered by the plurality of light rays, the plurality of transmittance functions being related to volumetric and surface primitives; and
   generating the visibility function from the plurality of transmittance functions.

2. The method of claim 1 wherein the plurality of transmittance functions includes at least one surface transmittance function, the at least one surface transmittance is characterized by at least a first opacity.

3. The method of claim 1 wherein the plurality of transmittance functions includes at least one surface transmittance function, the at least one surface transmittance is characterized by at least a first depth.

4. The method of claim 1 wherein the plurality of transmittance functions includes at least one volumetric transmittance function, the at least one volumetric transmittance function is associated with at least one extinction coefficient.

5. The method of claim 1 wherein the generating the visibility function comprises:
evaluating the plurality of transmittance functions;
determining a total transmittance function;
determining the visibility function based on the total transmittance function.

6. The method of claim 5 wherein each of the plurality of transmittance functions is associated with a depth value.

7. A system for rendering shadow comprising:
a computer program product including a computer readable medium including instructions for rendering shadow, wherein a visibility function is used to determine a light contribution from a light source associated with geometric elements;
a processor for executing the instructions for rending shadow;
wherein the instructions include;
one or more computer executable codes for projecting a plurality of light rays through an object scene;
one or more computer executable codes for determining a plurality of transmittance functions of depth by evaluating properties of geometric elements encountered by the plurality of light rays, the plurality of transmittance functions being related to volumetric and surface primitives; and
one or more computer executable codes for generating the visibility function from the plurality of transmittance functions.

8. The system of claim 7 wherein the plurality of transmittance functions includes at least one surface transmittance function, the at least one surface transmittance is characterized by at least a first opacity.

9. The system of claim 7 wherein the plurality of transmittance functions includes at least one surface transmittance function, the at least one surface transmittance is characterized by at least a first depth.

10. The system of claim 7 wherein the plurality of transmittance functions includes at least one volumetric transmittance function, the at least one volumetric transmittance function is associated with at least one extinction coefficient.

11. A memory for storing deep shadow map for access by an application program being executed on a data processing system, comprising:
a data structure stored in the memory, the data structure including information resident in a database used by the application program and including:
a plurality of data objects including an array of data objects, the array of data objects including a plurality of rows and a plurality of columns, the plurality of rows including a first row, the plurality of columns including a first column;
wherein:
the plurality of data objects including a first data object corresponding to the first row and the first column and associated with at least a depth variable related to a first dimension;
the first data object includes a first referent attribute associated with a second dimension and a second referent attribute associated with a third dimension;
the first data object includes a visibility function of at least the depth variable, the visibility function being equal to a maximum value at a first depth value and equal to a minimum value at a second depth value;
the visibility function is capable of being equal to each value between the minimum value and the maximum value, and of being equal to any value between the maximum value and the minimum value.

12. The memory of claim 11 wherein the maximum value equals 1.

13. The memory of claim 11 wherein the minimum value equals 0.

* * * * *